(12) United States Patent (10) Patent No.: US 7,526,645 B2
Miyazaki et al. (45) Date of Patent: Apr. 28, 2009

(54) ELECTRONIC DOCUMENT AUTHENTICITY ASSURANCE METHOD AND ELECTRONIC DOCUMENT DISCLOSURE SYSTEM

(75) Inventors: Kunihiko Miyazaki, Yokohama (JP); Mitsuru Iwamura, Tokyo (JP); Tsutomu Matsumoto, Yokohama (JP); Ryoichi Sasaki, Fujisawa (JP); Hiroshi Yoshiura, Tokyo (JP); Hirokazu Aoshima, Sagamihara (JP); Hideo Noyama, Yokohama (JP); Seiichi Susaki, Yokohama (JP); Takeshi Matsuki, Musashino (JP)

(73) Assignee: Hitachi, Ltd., Tokyo (JP)

( * ) Notice: Subject to any disclaimer, the term of this patent is extended or adjusted under 35 U.S.C. 154(b) by 881 days.

(21) Appl. No.: 10/787,262

(22) Filed: Feb. 27, 2004

(65) Prior Publication Data

US 2005/0015600 A1 Jan. 20, 2005

(30) Foreign Application Priority Data

Jul. 15, 2003 (JP) ............................. 2003-196860
Jan. 15, 2004 (JP) ............................. 2004-007458

(51) Int. Cl.
*H04L 9/00* (2006.01)
(52) U.S. Cl. .................................................. 713/167
(58) Field of Classification Search .................. 713/167
See application file for complete search history.

(56) References Cited

U.S. PATENT DOCUMENTS 6,671,805 B1 * 12/2003 Brown et al. ................. 713/176
6,963,971 B1 * 11/2005 Bush et al. ................... 713/153

(Continued)

FOREIGN PATENT DOCUMENTS

JP 2001-167086 6/2001

(Continued)

OTHER PUBLICATIONS

Ron Steinfeld et al.; "Content Extraction Signatures"; Information Secudty and Cryptology—ISISC 2001; 304; Springer-Verlag Berlin Heidelberg New York; Germany.*

(Continued)

*Primary Examiner*—Kambiz Zand
*Assistant Examiner*—Aubrey H Wyszynski
(74) *Attorney, Agent, or Firm*—McDermott Will & Emery LLP

(57) ABSTRACT

An electronic document authenticity assurance technique and an information disclosure system both of which can compatibly realize the assurance of the authenticity of disclosure documents and the deletion of information inappropriate for disclosure. An electronic document is divided into constituent elements and an electronic signature is affixed to an arbitrary subset of a set including all the constituent elements. Otherwise, an electronic signature is affixed to data obtained by binding each of the constituent elements to information specifying the relationship between a respective one of the constituent elements and the structure of the electronic document. Otherwise, the hash values of the respective constituent elements are calculated and an electronic signature is affixed to data obtained by binding the calculated hash values together. Otherwise, random numbers generated for the respective constituent elements are bound together, then the hash values of the respective random-numbered constituent elements are calculated, and then an electronic signature is affixed to data obtained by binding the calculated hash values together.

9 Claims, 18 Drawing Sheets

U.S. PATENT DOCUMENTS

| | | |
|---|---|---|
| 7,174,460 B2 | 2/2007 | Horita et al. |
| 2003/0056102 A1 | 3/2003 | Aho et al. |
| 2003/0145197 A1 | 7/2003 | Lee et al. |
| 2004/0255116 A1 | 12/2004 | Hane et al. |

FOREIGN PATENT DOCUMENTS

| | | |
|---|---|---|
| WO | WO 00/19296 | 4/2000 |
| WO | WO 01/11843 | 2/2001 |

OTHER PUBLICATIONS

Ron Steinfeld et al.; "Content Extraction Signatures"; *Information Security and Cryptology—ISISC 2001*; c. 2002; pp. 284-304; Springer-Verlag Berlin Heidelberg New York; Germany.

Bruce Scheiner; "Public-Key Digital Signal Algorithms"; *Applied Cryptography Second Edition: protocols, algorithms, and source code in C*; c. 1996; pp. 483-503; John Wiley & Sons, Inc.; United States & Canada.

May 10, 2007 Office Action from U.S. Appl. No. 10/644,064.

XP-002385495, Content Extraction Signatures, Ron Steinfeld et al. pp. 285-304.

\* cited by examiner

FIG. 17
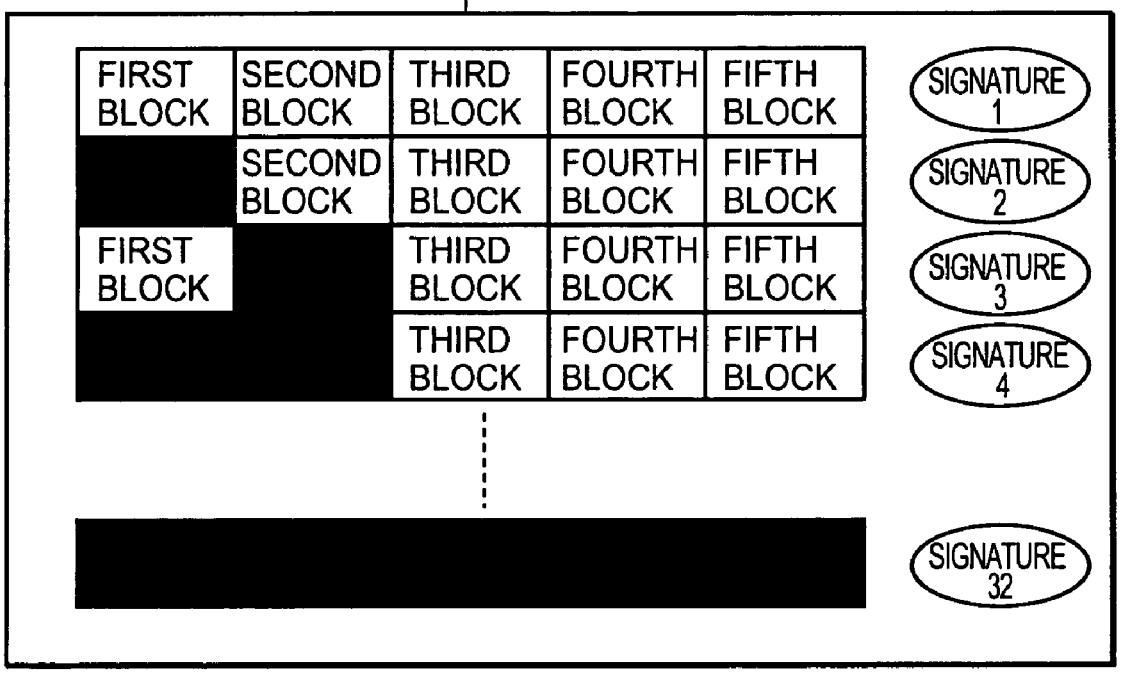
107 SIGNED ORIGINAL DOCUMENT
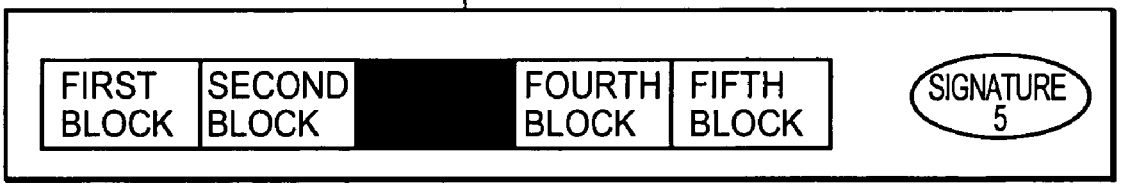
108 DISCLOSURE DOCUMENT

FIG. 18
107 SIGNED ORIGINAL DOCUMENT
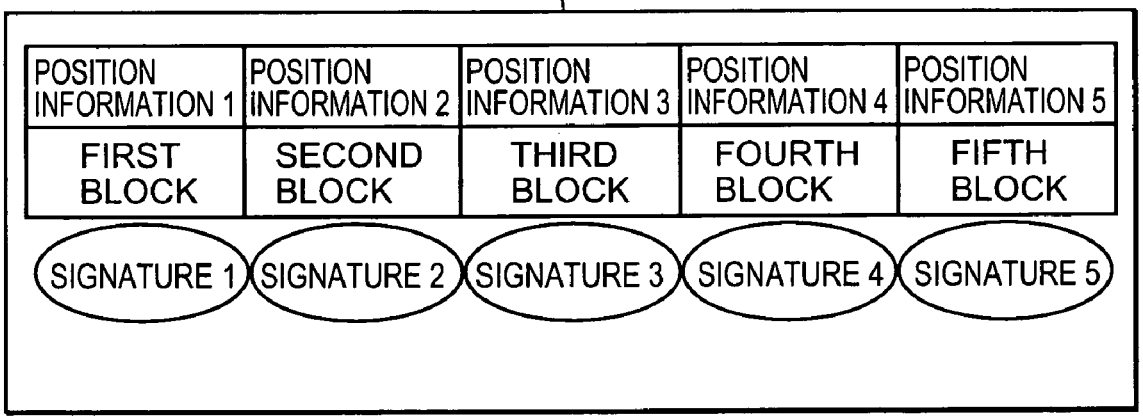
108 DISCLOSURE DOCUMENT
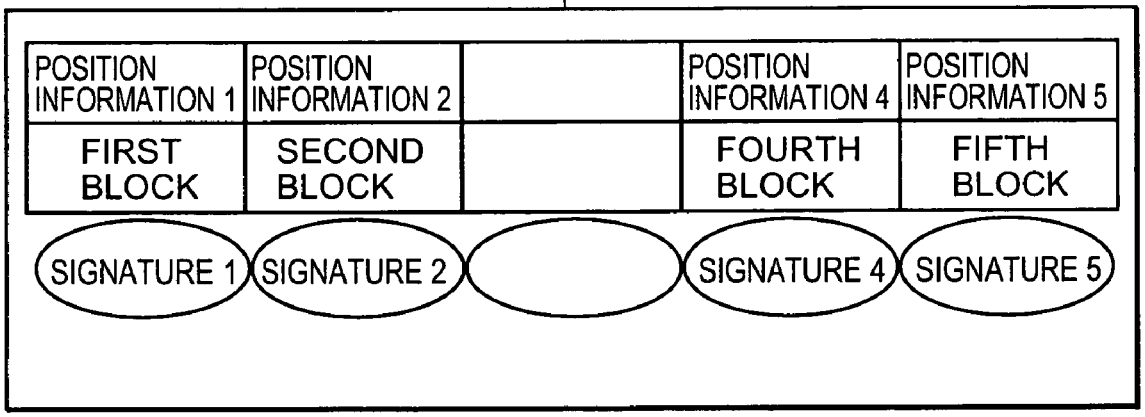

FIG. 19
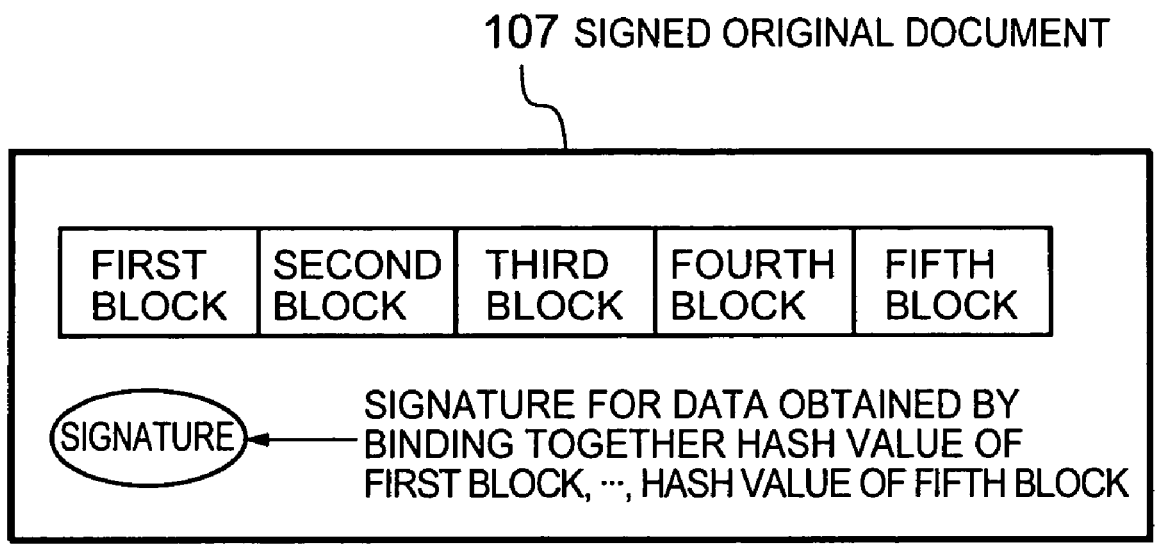
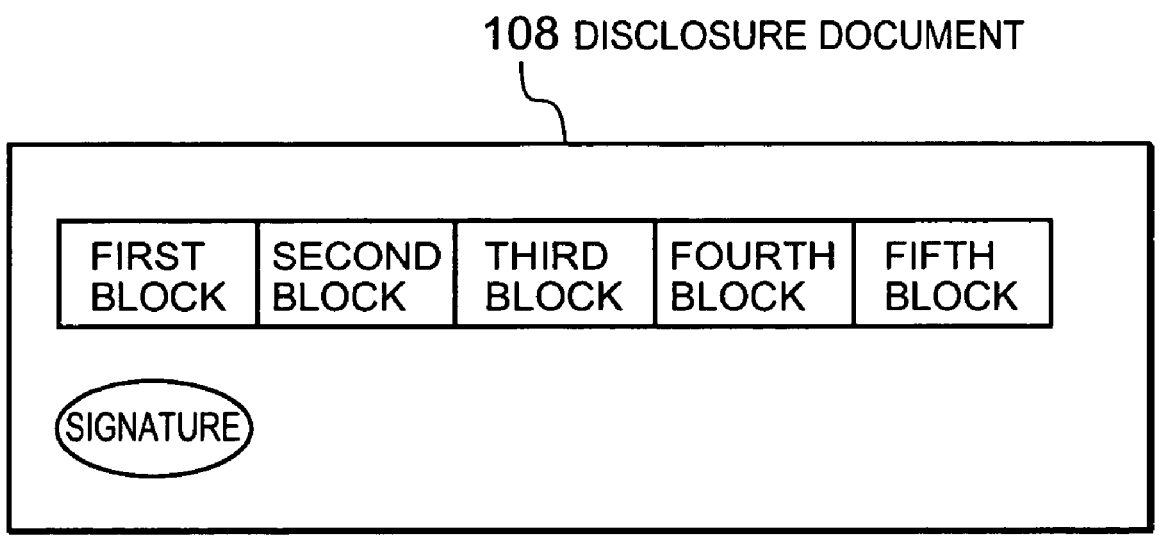

FIG. 20
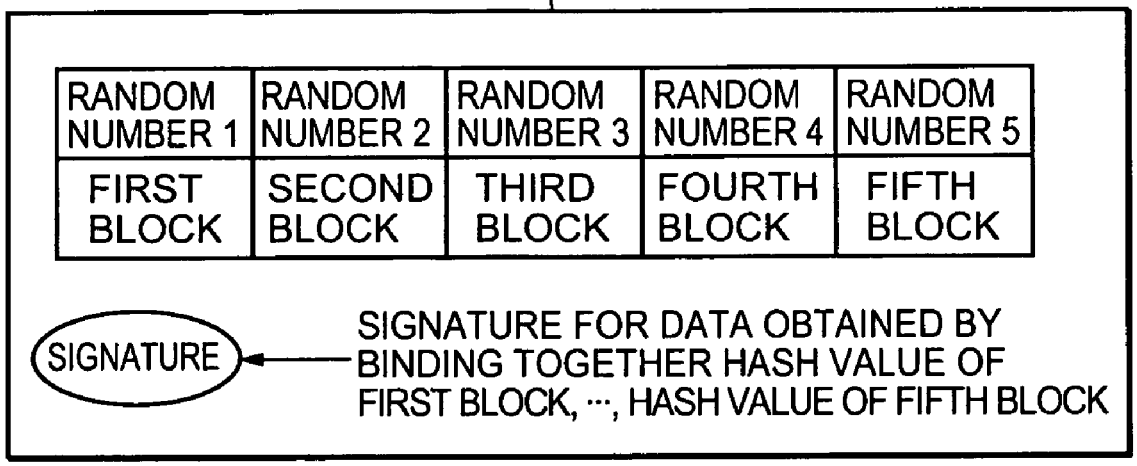
107 SIGNED ORIGINAL DOCUMENT
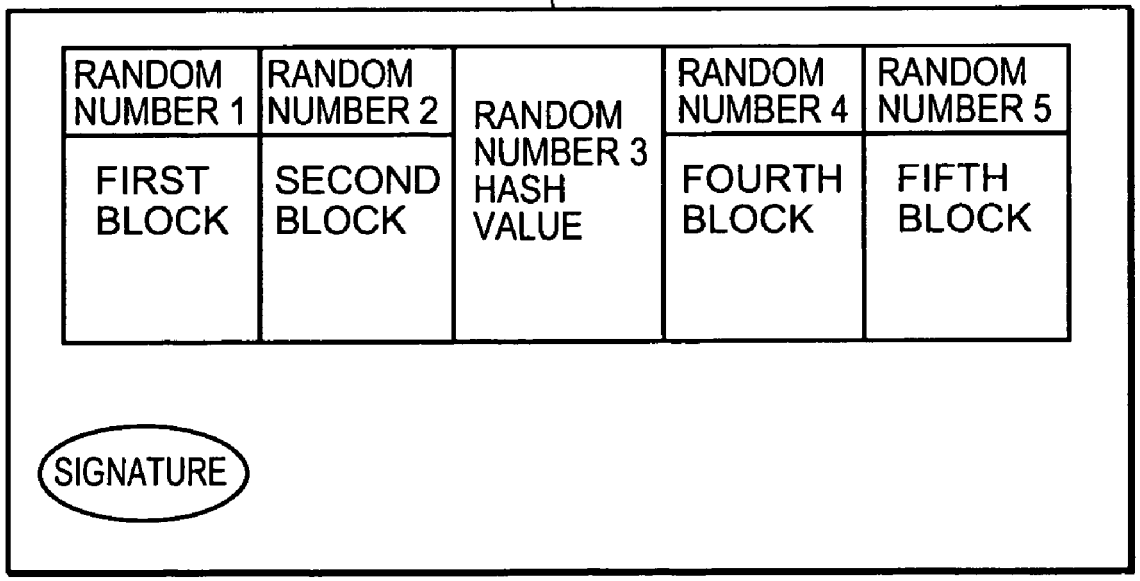
108 DISCLOSURE DOCUMENT

FIG. 24

| BASIC FIELD | |
|---|---|
| VERSION | V3 |
| SERIAL NUMBER | 123456789 |
| SIGNATURE ALGORITHM | SHA1- with RSA |
| VALIDITY PERIOD | 2001/1/1-2005/12/31 |
| ISSUER | ○○ |
| OWNER | YAMDA TARO |
| PUBLIC KEY | (RSA 1024-BIT) |

2411
2412
2413
2410
2414
2415
2416
2417

| EXTENSION FIELD | |
|---|---|
| FAMILY NAME | YAMADA |
| PERSONAL NAME | TARO |
| DATE OF BIRTH | 1980/1/1 |
| SEX | MALE |
| ADDRESS | ○○-KEN, ××-SHI |
| CERTIFICATE POLICY INFORMATION | |

2421
2422
2420
2423
2424
2425
2426

| SIGNATURE OF AUTHORITY |
|---|

2430

ELECTRONIC DOCUMENT AUTHENTICITY ASSURANCE METHOD AND ELECTRONIC DOCUMENT DISCLOSURE SYSTEM

INCORPORATION BY REFERENCE

This application claims priority based on Japanese patent applications, No. 2004-007458 filed on Jan. 15, 2004 and No. 2003-196860 filed on Jul. 15, 2003, the entire contents of which are incorporated herein by reference.

BACKGROUND OF THE INVENTION

The present invention relates to electronic data authenticity assurance techniques.

Electronic signature (also called digital signature) techniques have heretofore been known as techniques which perform authenticity assurance of electronic data such as electronic documents. (Refer to, for example, Bruce Schneier, Applied Cryptography: Protocols, Algorithms, and Source Code in C, Second Edition, John Wiley & Sons, (Oct. 18, 1995), pp. 483-502 (hereinafter referred to as Non-Patent Document 1)).

There are also techniques which take out individual entities of a structured electronic document as accessible and editable structured documents. (Refer to, for example, Japanese Patent Laid-open Publication No. 2001-167086 (FIG. 17) (hereinafter referred to as Patent Document 1)).

There are also techniques which are capable of deleting a portion permitted by a signer different from an owner from a document owned by the owner to which a signature is previously affixed by the signer, and which are capable of verifying the validity of the signed document after deletion. (Refer to, for example, Ron Steinfeld, Laurence Bull, Yuliang Zheng, Content Extraction Signatures, In International Conference on Information Security and Cryptology ICISC 2001, volume 2288 of LNCS, pp. 285-304, Berlin, 2001, Springer-Verlag, (2001) (hereinafter referred to as Non-Patent Document 2)).

SUMMARY OF THE INVENTION

The current electronic signature techniques which are important techniques supporting the security of electronic documents are designed to detect even 1-bit modifications to electronic documents. This nature is very useful in the sense of protection of electronic documents from modifications by dishonest persons. However, from the point of view of effective use of electronic documents, the nature is an obstacle because no modification at all is permitted.

A situation which plainly shows this problem is information disclosure in administrative organs and the like. For example, the following form of use of electronic signatures can be supposed.

Namely, in administrative organs, documents officially created by officials (administrative documents) are archived with electronic signatures affixed in order to make creators clear and to prevent alterations. When those documents are to be disclosed on the basis of the Freedom of Information Law, the personal information and the national security information described in the documents to be disclosed are made partially undisclosed by processing such as deletion or blackout.

However, none of the relate-art electronic signature techniques is capable of confirming the authenticity of a document disclosed in accordance with the above-mentioned series of procedures, namely, who the document creator is and whether the disclosed document is the same as the original created document. This is because part of the document is deleted in the process of information disclosure. From the point of view that a certain modification is applied to the document, it makes no difference whether the deletion is merely a malicious alteration or personal information is duly deleted for protection of privacy information. In consequence, two important security requirements, i.e., "authenticity assurance of disclosed document" and "protection of privacy information", cannot be compatibly realized with the use of the related-art electronic signature techniques, so that either of them must be abandoned.

When it is considered that an information disclosure institution is for establishing accountability of administrative organs, it is desirable that the identity of a disclosure document to the original administrative document can be verified even from a disclosure document in which personal information or the like is deleted from the original document.

The art described in Patent Document 1 discloses the technique of the data of each entity of a electronic document with electronic signature data, but does not disclose the technique of confirming the authenticity of the original document without altering the original electronic signature after the editing of an electronic document.

Therefore, it has been desired to develop electronic document authenticity assurance techniques which allow appropriate modifications to be applied to authenticity assurance object documents, that is to say, techniques which are capable of confirming the authenticity of the original document without altering the original electronic signature after the editing of an electronic document.

The art described in Non-Patent Document 2 discloses a technique capable of deleting a portion permitted by a signer from a document which is owned by an owner and has a signature affixed previously by the signer different from the owner, and also capable of confirming the validity of a signed document after deletion, but does not disclose an art suited to the information disclosure institution.

For example, in the case of information disclosure, it is desired that a disclosure document creator different from a signer determine a disclosure portion of an original document which has been created by the signer or whose content has been confirmed by the signer, and delete information as to a portion inappropriate for disclosure. Furthermore, as to a portion to be disclosed, it is desired that the disclosure document creator disclose its information in the state where further deletions by third parties can be allowed or prevented, according to the content of the portion to be disclosed. However, Non-Patent Document 2 does not disclose a technique which enables such a disclosure document creator to select whether to permit or prevent modifications by third parties.

Therefore, it is desired to develop information disclosure methods and information disclosure systems which meet the requirements and the form of use of documents which are authenticity assurance object documents subjected to appropriate modifications.

The present invention provides electronic document authenticity assurance techniques and document management systems which allow approximate modifications to be applied to authenticity assurance object documents.

In one aspect, the present invention provides an electronic signature method which divides an electronic document into constituent elements and affixes an electronic signature to an arbitrary subset of a set including all the constituent elements.

In another aspect, the present invention provides an electronic signature method which divides an electronic document into constituent elements and affixes an electronic signature to data obtained by binding each of the constituent elements to information specifying the relationship between a respective one of the constituent elements and the structure of the electronic document.

In another aspect, the present invention provides an electronic signature method which divides an electronic document into constituent elements, calculates the hash values of the respective constituent elements by means of a cryptographic hash function, and affixes an electronic signature to data obtained by binding the calculated hash values together.

In another aspect, the present invention provides an electronic signature method which divides an electronic document into constituent elements, generates and binds random-numbers to the respective constituent elements, calculates the hash values of the respective random-numbered constituent elements by means of a cryptographic hash function, and affixes an electronic signature to data obtained by binding the calculated hash values together. Incidentally, the hash function converts an arbitrary-length message into a fixed-length (short) data (called a hash value). Among hash functions, a function having the following two natures is called a cryptographic hash function: (1) it is difficult to find an input message which provides an output having a given hash value (one-way); and (2) it is difficult to find two different input messages which provide the same hash value (collision resistant).

According to one aspect of the present invention, there is provided an electronic document disclosure system for information disclosure of administrative organs and the like. At the time of creation of an original electronic document, an original document creator affixes an electronic signature to the created electronic document in accordance with an electronic signature method provided by one aspect of the present invention, and stores the obtained electronic document into a document management unit. At the time of acceptance of an information disclosure request, a disclosure document creator takes out a disclosure object document from the electronic documents stored in the document management unit, and creates a disclosure document in which information not to be disclosed is omitted in accordance with a method provided by one aspect of the present invention, such as personal information contained in the disclosure object document, and sends the disclosure document to a recipient unit for making the disclosure document published. At the time of reception of the disclosure document which has been published, a recipient can verify the signature of the original document creator in accordance with a method provided by one aspect of the present invention.

According to the present invention, there is provided authenticity assurance of electronic documents which enables the authenticity of electronic documents to be verified even after partial information has been deleted. In addition, there is provided an information disclosure system capable of assuring the secrecy of important information such as personal information and the authenticity of disclosure documents.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 17 is a schematic view showing the configurations of a signed original document 107 and a disclosure document 108 which are created according to the first embodiment.

FIG. 18 is a schematic view showing the configurations of the signed original document 107 and the disclosure document 108 which are created according to the second embodiment.

FIG. 19 is a schematic view showing the configurations of the signed original document 107 and the disclosure document 108 which are created according to the third embodiment.

FIG. 20 is a schematic view showing the configurations of the signed original document 107 and the disclosure document 108 which are created according to the fourth embodiment.

FIG. 24 is a view showing the configuration of a public key certificate according to a seventh embodiment.

DETAILED DESCRIPTION OF THE EMBODIMENTS

Figure 1:
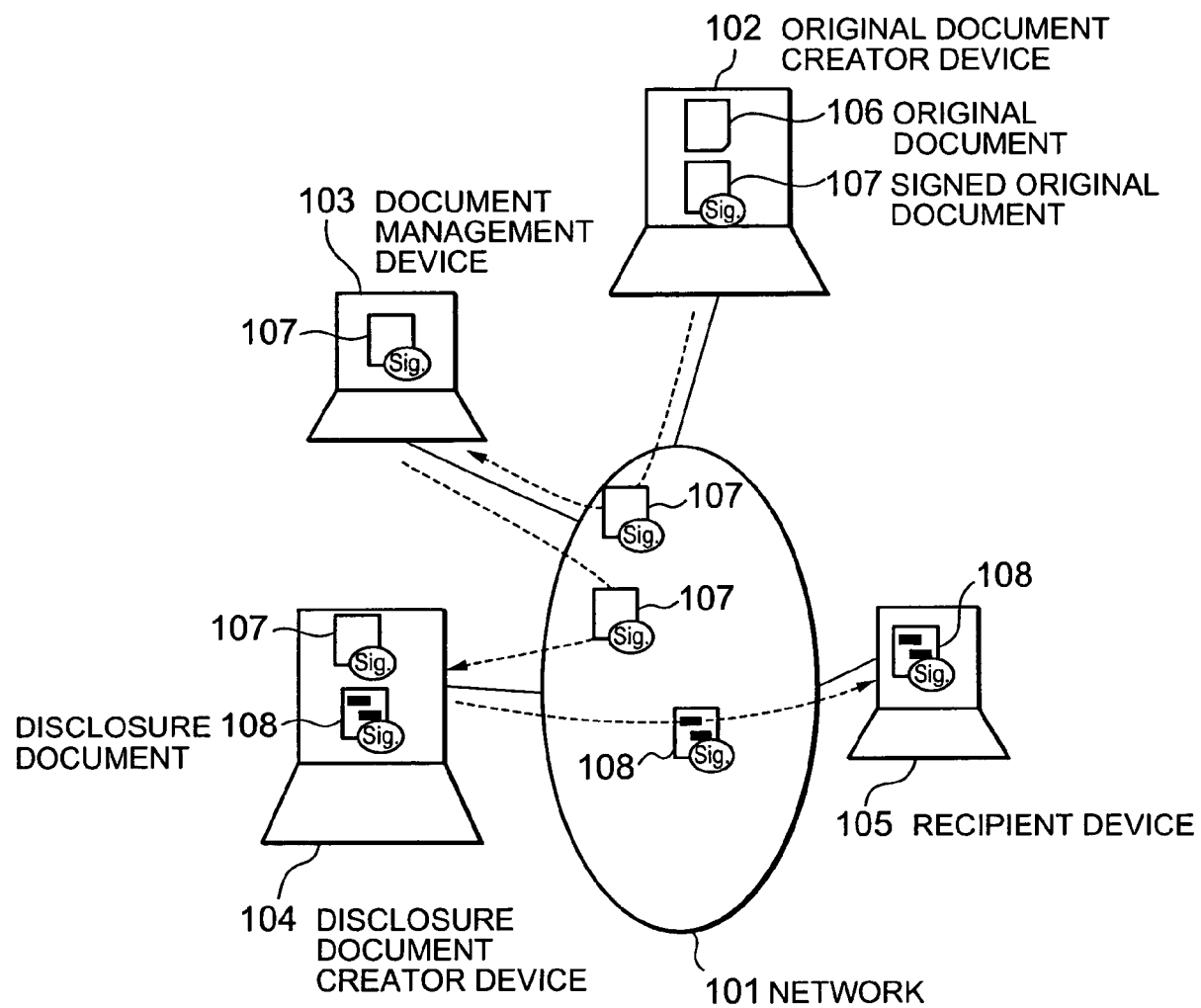
FIG. 1 is a schematic configuration view of a network system which realizes each embodiment of the present invention.

FIG. 1 is a schematic configuration view of a system for use in a plurality of embodiments in which the present invention is applied to an information disclosure system. In the following description, reference will be made to an information disclosure system of an administrative organ by way of example, but the present invention can be similarly applied to information disclosure systems for organs other than administrative organs or individuals.

As shown in the figure, this system includes an original document creator unit 102, a document management unit 103, a disclosure document creator unit 104, and a recipient unit 105, all of which are connected to one another via a network 101. The original document creator unit 102, the document management unit 103 and the disclosure document creator unit 104 are used by officials of an administrative organ who is on an information disclosure side, while the recipient unit 105 is used by ordinary citizens who are on an information disclosure request and verification side.

In the following description, each of the embodiments is described taking an example where the original document creator unit 102, the document management unit 103 and the disclosure document creator unit 104, all of which are used by officials of an administrative organ, as well as the recipient unit 105 to be used by ordinary citizens are connected to the same network 101. However, the connection forms may be different from this example. For example, the original document creator unit 102, the document management unit 103 and the disclosure document creator unit 104 which are used by officials of an administrative organ may be connected to a LAN (Local Area Network) of the administrative organ, and the LAN may be connected via a gateway server to the network 101 to which the recipient unit 105 to be used by ordinary citizens is connected. This connection form is preferable in terms of information security, because the LAN of the administrative organ can be protected from attacks such as illegal access from the external network 101, by means of a gateway server.

The original document creator unit 102 is used by an original document creator who is an official of the administrative organ, creates an administrative document as electronic data (an officially created document), affixes an electronic signature to the created administrative document, and after that, requests a signed administrative document to the document management unit 103. In the following description of each of the embodiments, an administrative document to which an original document creator is to affix a signature is hereinafter referred to as an original document 106. In addition, the each of the following embodiments is described taking an example where the creation of the original document 106 and the affixture of a signature to the original document 106 are both performed in the original document creator unit 102. Unlike this example, a unit used to create the original document 106 and an unit used to affix a signature to the original document 106 may be separated from each other and the original document 106 may be transferred between these units by means of the network 101 or a portable storage medium.

When the document management unit 103 accepts a request from the original document creator unit 102, it archives a signed original document 107 created in the original document creator unit 102. When the document management unit 103 accepts a request from the disclosure document creator unit 104, it transmits to the original document creator unit 102 the signed original document 107 which is previously archived and is a disclosure object. In terms of information security, it is preferable that the document management unit 103 perform access control by performing appropriate user authentication processing and the like at the time of the acceptance of the archive request from the original document creator unit 102 and at the time of the acceptance of the disclosure object document transmission request.

When the disclosure document creator unit 104 accepts an information disclosure request operated by an ordinary citizen who is a user of the recipient unit 105, it retrieves a disclosure object document corresponding to the information disclosure request, and requests the document management unit 103 to transmit the signed original document 107 which is the disclosure object document. Next, the disclosure document creator unit 104 is operated by an operator to create a disclosure document 108 in which information which is inappropriate for disclosure in terms of protection of personal information and protection of information relative to national secrets is deleted from the information contained in the signed original document 107 received from the document management unit 103, and the disclosure document creator unit 104 makes the created disclosure document 108 published to the recipient unit 105.

At this time, if the signature affixed to the original document 106 is a signature created by a related-art electronic signature technique, even in the case of "deletion of information inappropriate for disclosure", the result is a failure in signature verification, as in the case where the original document 106 undergoes an illegal manipulation. Each of the following embodiments uses a novel electronic signature technique capable of effecting signature verification even after the deletion of inappropriate information.

The method of disclosing the disclosure document 108 may be arbitrarily designed; for example, the disclosure document 108 may be transmitted by electronic mail or uploaded to a Web server managed by the administrative organ or another organ. The method of uploading the disclosure document 108 to the Web server has the merit that not only the user of the recipient unit 105 who has made the information disclosure request, but also can read the disclosed information.

Each of the embodiments is described taking an example where the disclosure document creator unit 104 carries out acceptance of an information disclosure request from an ordinary citizen, retrieval of a disclosure object document, a request to the document management unit 103 for the disclosure object document, creation of the disclosure document 108, and disclosure of the disclosure document 108. However, different configurations may be adopted. For example, acceptance of an information disclosure request from an ordinary citizen, retrieval of a disclosure object document, and a request to the document management unit 103 for the disclosure object document may be carried out in a unit different from the disclosure document creator unit 104, while creation of the disclosure document 108 and disclosure of the disclosure document 108 maybe carried out in the disclosure document creator unit 104.

The recipient unit 105 is used so that an ordinary citizen who is a user of the recipient unit 105 requests information disclosure from the administrative organ and verifies the authenticity of the disclosure document 108 disclosed according to the request. The recipient unit 105 transmits the information necessary for identifying a disclosure object document to the disclosure document creator unit 104 and requests information disclosure. In addition, the recipient unit 105 verifies whether the contents of the disclosure document 108 open to the ordinary citizen and the original document 106 are the same except a part omitted in terms of protection of information (an undisclosed part).

The recipient unit 105 displays or prints the disclosure document 108 open to the ordinary citizen in the state where the undisclosed part is covered with black color (hereinafter referred to as "blacked out") so that the user is permitted to read the disclosure document 108.

Each of the embodiments is described taking an example where an information disclosure request and verification of the authenticity of the disclosure document 108 are carried out in the same recipient unit 105. However, different configurations may be adopted. For example, an information disclosure request may be made in a unit different from the recipient unit 105, and verification of the authenticity of the disclosure document 108 made open to the user may be carried out in the recipient unit 105.

Figure 2:
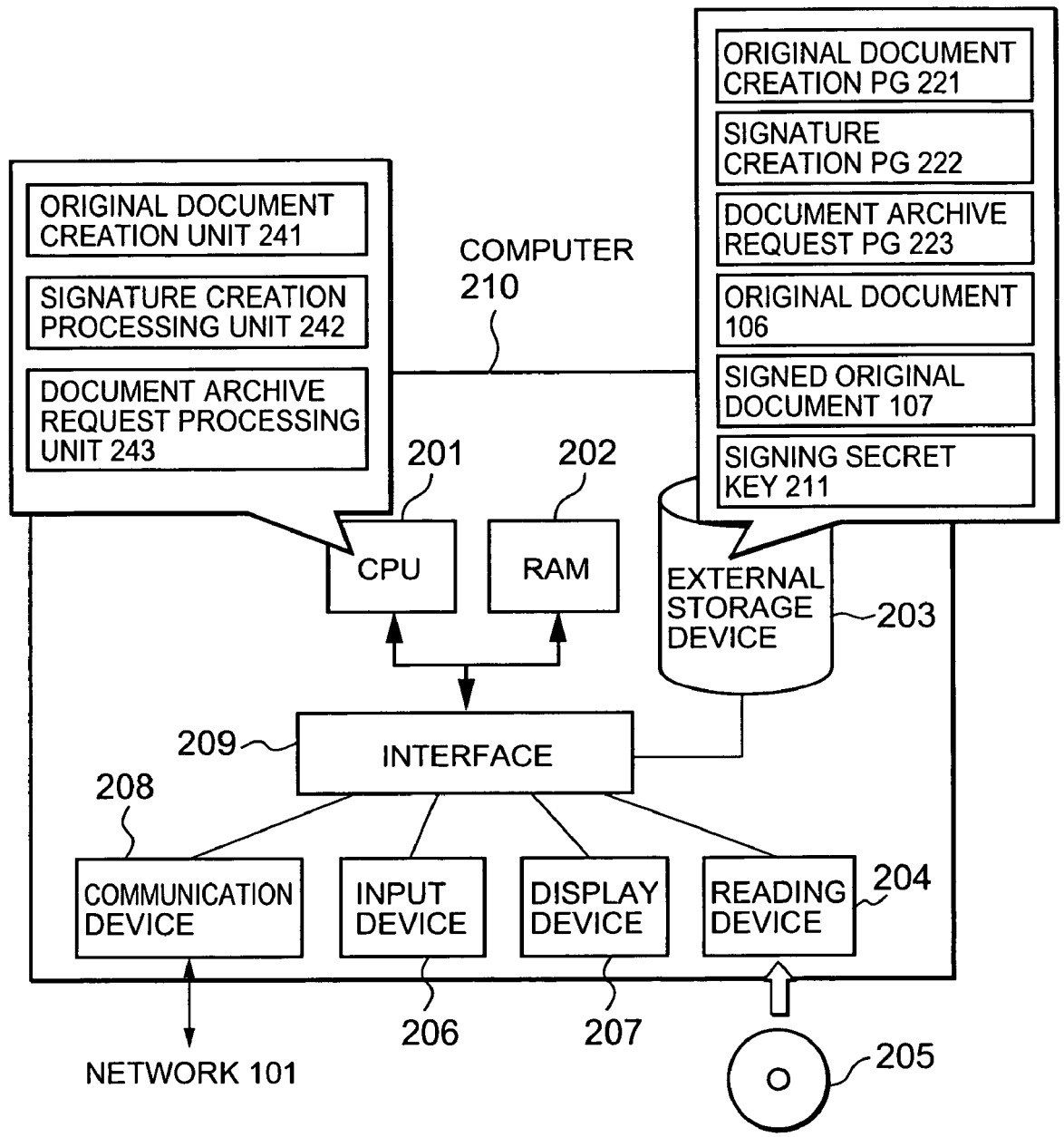
FIG. 2 is a schematic configuration view of a computer which realizes an original document creator unit 102 in each embodiment of the present invention.

FIG. 2 is a view showing a schematic configuration of the original document creator unit 102 used in each of the following embodiments.

The original document creator unit 102 can be constructed with a computer 210 having a general configuration and including a CPU 201, a RAM 202 which functions as a work area for the CPU 201, an external storage unit 203 such as a hard disk drive unit, a reading unit 204 which reads data from a storage medium 205 having portability such as a CD-ROM and a FD, an input unit 206 such as a keyboard and a mouse, a display unit 207 such as a display, a communication unit 208 which performs communication with another unit via a network, and an interface 209 responsible for data transfer between the above-mentioned constituent elements.

An original document creation PG (program) 221, a signature creation PG (program) 222 and a document archive request PG (program) 223 are stored in the external storage unit 203 of the original document creator unit 102. These programs 221, 222 and 223 are loaded into the RAM 202, and are respectively embodied by the CPU 201 in the form of processes which are an original document creation unit 241, a signature creation processing unit 242 and a document archive request processing unit 243. In addition, data (such as the original document 106, the signed original document 107 and a signing secret key 211) which are inputs or outputs to or from these processing units 241, 242 and 243 are stored in the external storage unit 203. The signing secret key 211 is required to be managed particularly strictly in terms of security. For this reason, the signing secret key 211 may also be stored in a unit which has tamper resistance and differs from the external storage unit 203 in which the other data are stored.

Each of the document management unit 103, the disclosure document creator unit 104 and the recipient unit 105 also has the same configuration as the original document creator unit 102. However, a document archive PG (program) 224 and a requested document transmission PG (program) 225 as well as signed original documents requested to be archived are stored in an external storage unit of the document management unit 103. An information disclosure request acceptance PG (program) 226, a requested document retrieval PG (program) 227, a requested document transmission request PG (program) 228, a disclosure portion determining PG (program) 229, a disclosure document creation PG (program) 230 and a disclosure document opening PG (program) 231 are stored in an external storage unit of the disclosure document creator unit 104. An information disclosure request PG (program) 232 and a disclosure document verification PG (program) 233 are stored in an external storage unit of the recipient unit 105.

In the following description of each of the embodiments, it is assumed that each of the programs is stored in the external storage unit 203 in advance. However, when necessary, each of the programs may also be introduced into the external storage unit 203 or the RAM 202 via the external interface 209 through a storage medium such as an FD or a CD-ROM, or through a network such as the Internet which is a communications medium, or through a carrier wave which propagates through the network.

Figure 3:
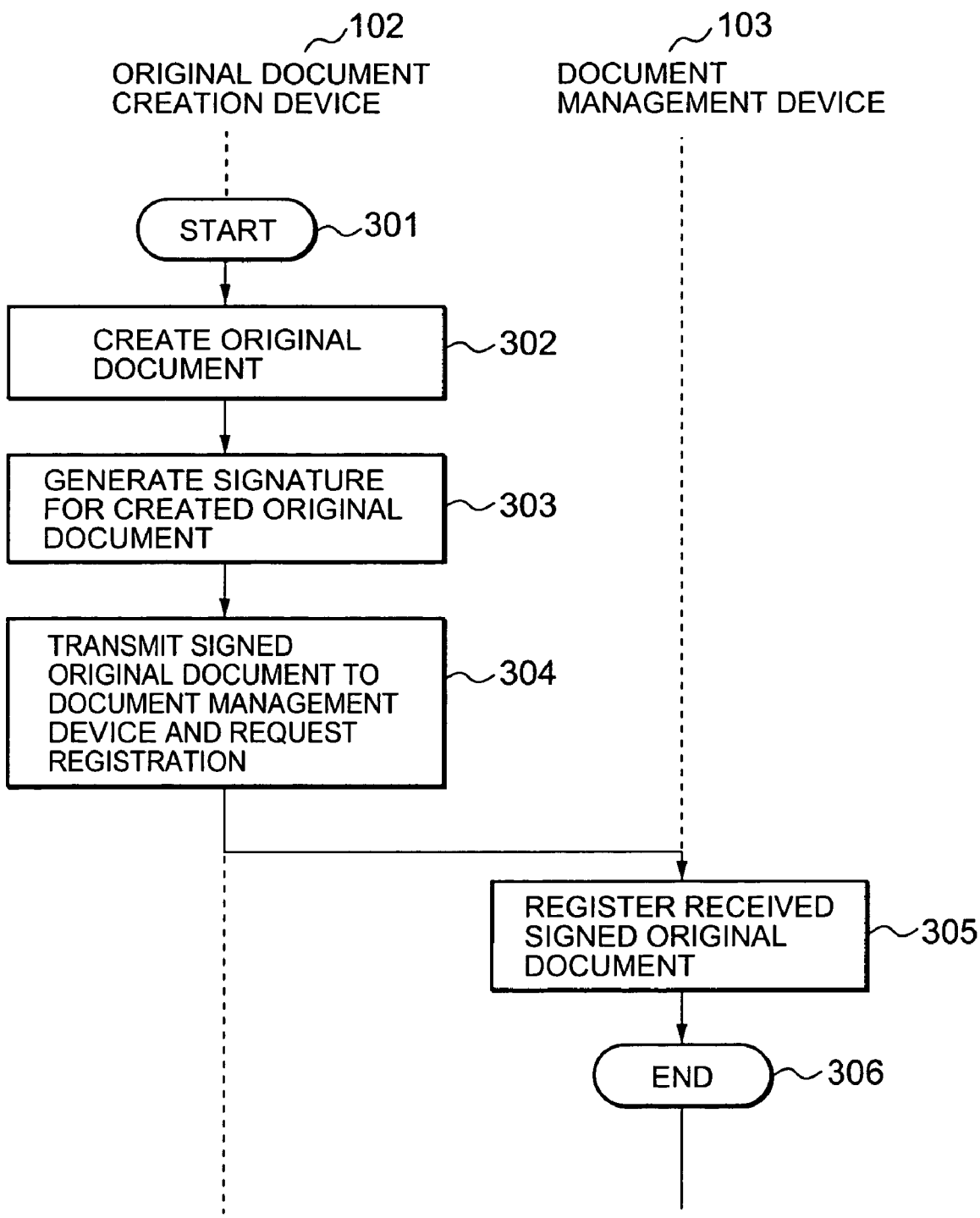
FIG. 3 is an explanatory view of the flow of creating and archiving an original document in each embodiment of the present invention.

FIG. 3 is a flowchart showing an outline of the processing of creating an administrative document which is an original document and archiving the administrative document in the document management unit in each of the following embodiments. At the time when an original document is created and archived, it is not necessarily possible to determine which portion of the document archived in the document management unit contains information to be disclosed or not to be disclosed when the document management unit accepts an information disclosure request in the future. In general, it seems, in many cases, impossible to determine which portion of the archived document is to be disclosed. Incidentally, in the following flowchart, the titles of programs which are respectively given in parentheses in individual steps represent programs which execute the processing of the corresponding steps.

Original Document Creation and Archive Flow (Processing of Original Document Creator Unit 102)

301: The processing is started.

302: An original document is created (the original document creation PG 221).

303: A signature is generated for the created original document (the signature creation PG 222).

304: The signed original document is transmitted to the document management unit 103 and the document management unit 103 is requested to register the signed original document (the document archive request PG 223) (the processing of the document management unit 103).

305: The received signed original document is registered (the document archive PG 224).

306: The processing is brought to an end.

Figure 4:
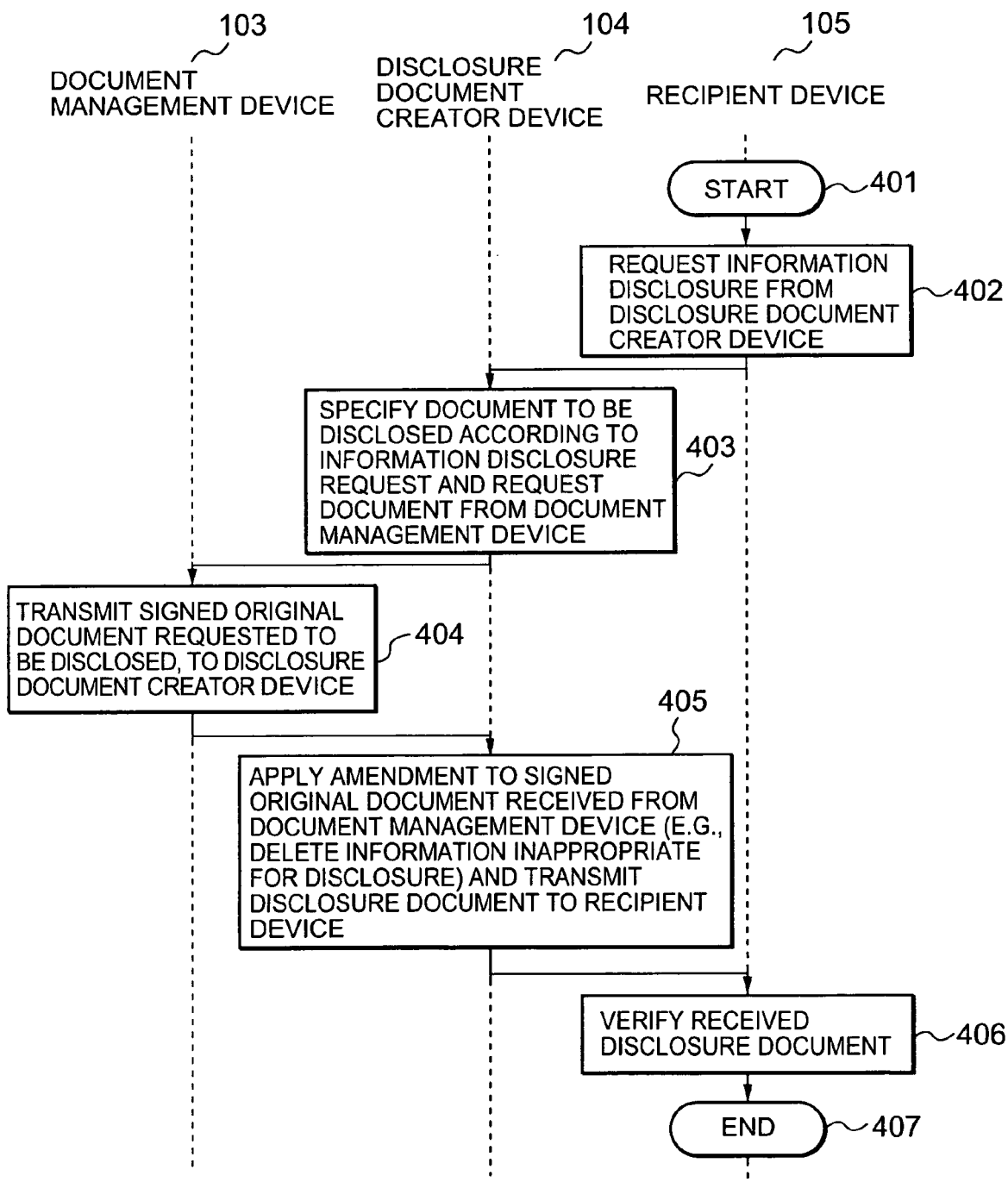
FIG. 4 is an explanatory view of the flow of disclosing information in each embodiment of the present invention.

FIG. 4 is a flowchart showing an outline of the processing of accepting an information disclosure request from an ordinary citizen and performing information disclosure in each of the following embodiments. Incidentally, in the following flowchart, the titles of programs which are respectively given in parentheses in individual steps represent programs which execute the processing of the corresponding steps.

Information Disclosure Flow (Processing of Recipient Unit 105)

401: The processing is started.

402: Information capable of specifying the range of information desired to be disclosed is transmitted in order to request the disclosure document creator unit 104 to perform information disclosure (the information disclosure request PG 232) (the processing of the disclosure document creator unit 104).

403: When the information which specifies the range of information desired to be disclosed is received (the information disclosure request acceptance PG 226) a document to be disclosed is retrieved on the basis of the information which specifies the range (the requested document retrieval PG 227), and the document is requested from the document management unit 103 (the requested document transmission request PG 228) (the processing of the document management unit 103).

404: The signed original document requested to be disclosed is transmitted to the disclosure document creator unit 104 (the requested document transmission PG 225) (the processing of the disclosure document creator unit 104).

405: The content of the received signed original document is confirmed in accordance with a predetermined information disclosure policy to determine a portion appropriate for disclosure (the disclosure document creation PG 229), and a disclosure document subjected to undisclosure processing which prevents leakage of information inappropriate for disclosure such as information concerning personal information or national secrets is created (the disclosure document creation PG 230), and the disclosure document is transmitted to the recipient unit 105 (the disclosure document opening PG 231) (the processing of the recipient unit 105).

406: The authenticity of the received disclosure document is verified (the disclosure document verification PG 233).

407: The processing is brought to an end.

In the information disclosure system whose outline has been described above, it is particularly noticeable that it is necessary to compatibly realize the assurance of the authenticity of a disclosure document and the deletion of information inappropriate for disclosure need to be made compatible.

In a service form in which disclosure documents are necessarily the same as original documents, if an original document creator applies a known electronic signature technique to affix a signature to an original document, a recipient can confirm the authenticity of a disclosure document (having the same data as the original document) by applying a known electronic signature verification technique.

However, in an information disclosure system of the embodiments of the present invention, an original document and a disclosure document are not necessarily the same. This is because there is a possibility that, at the time of information disclosure, original documents contain information inappropriate for disclosure (for example, information concerning the privacy of individuals or information not to be disclosed in terms of national security), and there is a need to omit (i.e., black out) the inappropriate information from the original document to make the information undisclosed. In this case, even if the original document is subjected to a modification, such as blackout, which seems appropriate or indispensable in terms of information disclosure, known electronic signature techniques can only provide an "unverifiable" result, as in the case where the original document undergoes a manipulation by a third party with malicious intent.

Accordingly, there is a demand for novel authenticity assurance techniques for electronic documents which are capable of compatibly realizing both the assurance of the authenticity of original documents and the deletion of information inappropriate for disclosure.

The desired natures of electronic document authenticity assurance techniques according to the following embodiments are as follows.

(Nature 1) It is possible to verify even a disclosure document containing an undisclosed portion, and if there is no modification except an undisclosed portion, verification succeeds.

(Nature 2) If a disclosure document contains a modification except the blackout of an original document, verification fails.

(Nature 3) Information containing an undisclosed portion cannot be inferred from a disclosure document.

(Nature 4) An attacker who tries to infer information of an undisclosed portion of a disclosure document cannot use the disclosure document as information which assures the correctness of the result of the inference.

The nature 1, which cannot be achieved by any known electronic signature technique, is a required condition which becomes necessary in the case where any (appropriate) modification may occur in an original document after the formation thereof, as in the case of information disclosure.

The nature 2 is a condition for discriminating between an allowable appropriate modification (i.e., blackout) and other modifications.

The nature 3 means that information does not leak from an undisclosed portion (blacked-out portion). For example, in the case of a method which makes a disclosure document published with the information of an undisclosed portion hidden by cryptographic technology or the like (as a cryptogram), it is necessary to design the method so that the cryptogram cannot be easily deciphered.

The nature 4 means that even if an undisclosed portion (blacked-out portion) is inferred, the inference can be denied. For example, it is assumed that an original document contains the expression "the suspect "A" denied having committed the crime, while a disclosure document contains the expression "the suspect "**" denied having committed the crime" (namely, the name of "A" which is personal information is not disclosed by an disclosure document creator). In addition, it is assumed that an attacker (or a recipient) who has seen this disclosure document infers from the context or other information that "" means "A", and tries verification by applying the name of A to the "" portion. If this verification succeeds, the disclosure document is likely to be used as information which assures the inference that "" is "A". This is because "A" is difficult to deny in a signature method in which the probability that it is possible to find out character strings which can be successfully verifiably applied to "**" except "A" is negligibly small in practical terms.

The following embodiments disclose a plurality of methods which can be used as electronic document authenticity assurance techniques which satisfy the above-mentioned natures.

First, a first embodiment will be described below. To describe how the first embodiment is realized, a detailed description will be given in connection with the signature creation PG 222 operating in the original document creator unit 102, the disclosure document creation PG 230 operating in the disclosure document creator unit 104, and the disclosure document verification PG 233 operating in the recipient unit 105.

Figure 5:
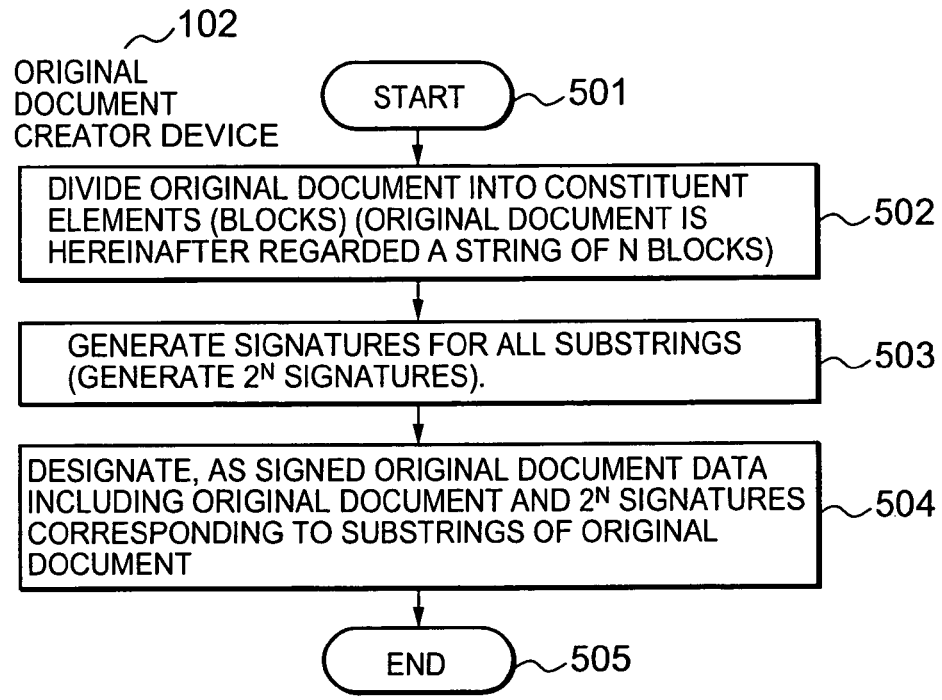
FIG. 5 is a view showing the flow of processing of a signature creation PG 222 according to a first embodiment.

FIG. 5 is a view showing the flow of processing of the signature creation PG 222 according to the first embodiment.

501: The processing is started.

502: An original document is divided into constituent elements (hereinafter referred to as blocks). As to the method of defining the constituent elements, for example, the original document may be defined as constituent elements on a byte-by-byte basis in order from its front, or in the case of a structured document like a document described by XML (extensible Markup Language), its minimum constituent elements may also be used. The original document is hereinafter regarded as a string of N blocks.

503: Signatures are generated for all substrings of the string of N blocks which is the original document, by using the secret key of the original document creator (2 to the N-th power of signatures are generated).

504: Data including the original document and the 2 to the N-th power of signatures corresponding to the substrings of the original document are designated as a signed original document.

505: The processing is brought to an end.

Figure 6:
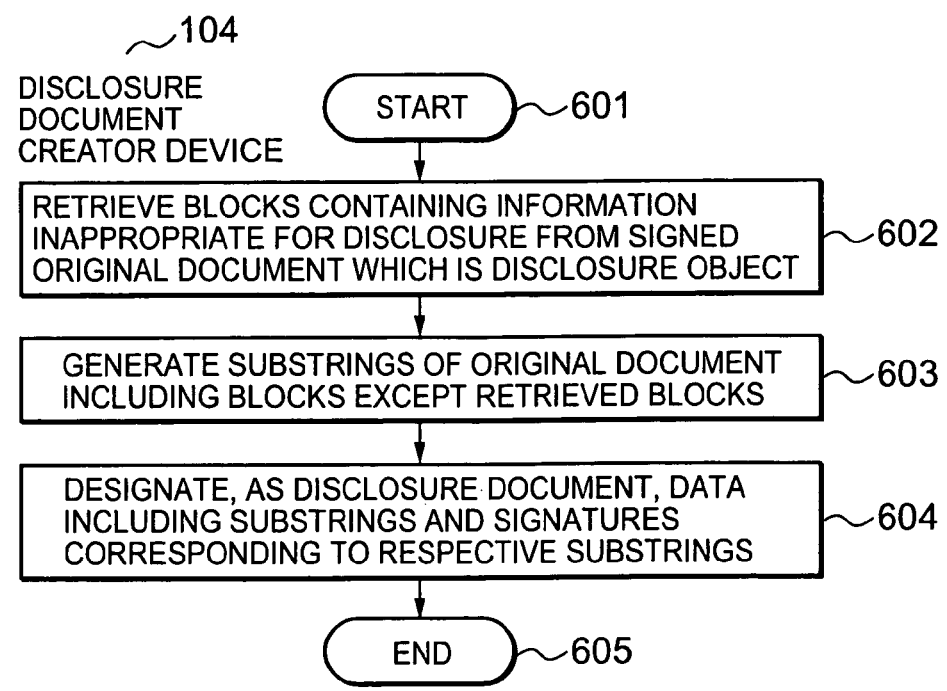
FIG. 6 is a view showing the flow of processing of a disclosure document creation PG 230 according to the first embodiment.

FIG. 6 is a view showing the flow of processing of the disclosure document creation PG 230 according to the first embodiment.

601: The processing is started.

602: Blocks containing information inappropriate for disclosure are retrieved from the signed original document which is the disclosure object document.

603: Substrings of the original document which include the remaining blocks except the retrieved blocks are generated.

604: Data including the substrings and the signatures corresponding to the respective substrings are designated as a disclosure document.

605: The processing is brought to an end.

Figure 7:
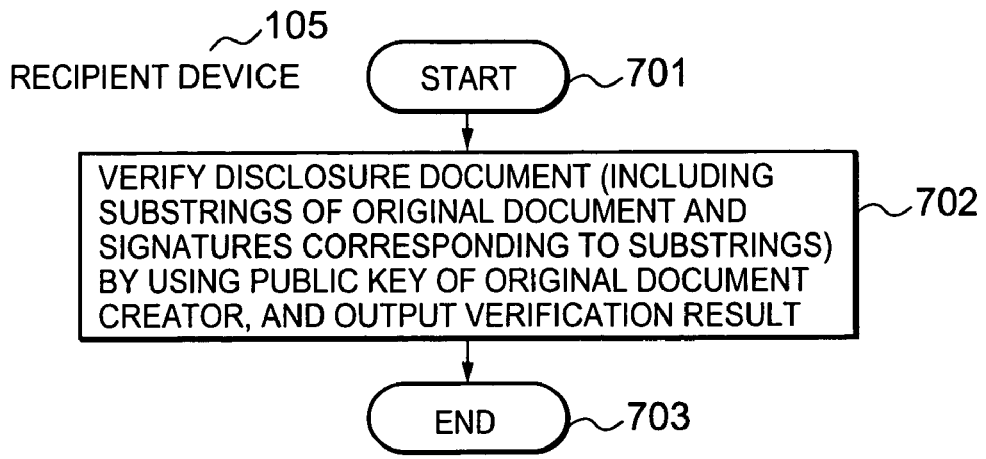
FIG. 7 is a view showing the flow of processing of a disclosure document verification PG 233 according to the first embodiment.

FIG. 7 is a view showing the flow of processing of the disclosure document verification PG 233 according to the first embodiment.

701: The processing is started.

702: The disclosure document (including certain substrings of the original document and the signatures corresponding to the respective substrings) is verified by using a public key of the original document creator, and the result of verification is outputted. The public key of the original document creator which is used for verification, for example, may be sent from the disclosure document creator unit 104 together with the disclosure document, or may be acquired as required from the original document creator unit 102. The public key can be desirably used together with a public-key credential which is issued by means of known PKI (Public-Key Infrastructure) techniques and makes it possible to reliably confirm the original document creator.

703: The processing is brought to an end.

As will be described below, the above-mentioned electronic document authenticity assurance technique (the first embodiment) satisfies the nature 1, the nature 2, the nature 3 and the nature 4.

In the first embodiment, the disclosure document includes the substrings of the original document and the signatures of the original document creator corresponding to the respective substrings. Accordingly, it is possible to confirm the authenticity of the disclosure document by using existing electronic signature verification techniques. The nature 1 and the nature 2 are, therefore, satisfied. In addition, the disclosure document does not include the blocks containing the information inappropriate for disclosure, and therefore, the nature 3 is satisfied. Furthermore, the signature information affixed to the disclosure document is unrelated to the blocks containing the information inappropriate for disclosure; that is to say, when the signatures affixed to the disclosure document are to be generated, the blocks containing the information inappropriate for disclosure are not used, so that the nature 4 is also satisfied.

As described above, the first embodiment satisfies the natures desired in each of the embodiments of the present invention, but has a problem in terms of efficiency. In the first embodiment, it is necessary to generate 2 to the N-th power of signatures for an original document including N blocks. However, a far more efficient method is desired.

A second embodiment which is improved in efficiency will be described below. To describe how the second embodiment is realized, a detailed description will be given in connection with the signature creation PG 222 operating in the original document creator unit 102, the disclosure document creation PG 230 operating in the disclosure document creator unit 104, and the disclosure document verification PG 233 operating in the recipient unit 105.

Figure 8:
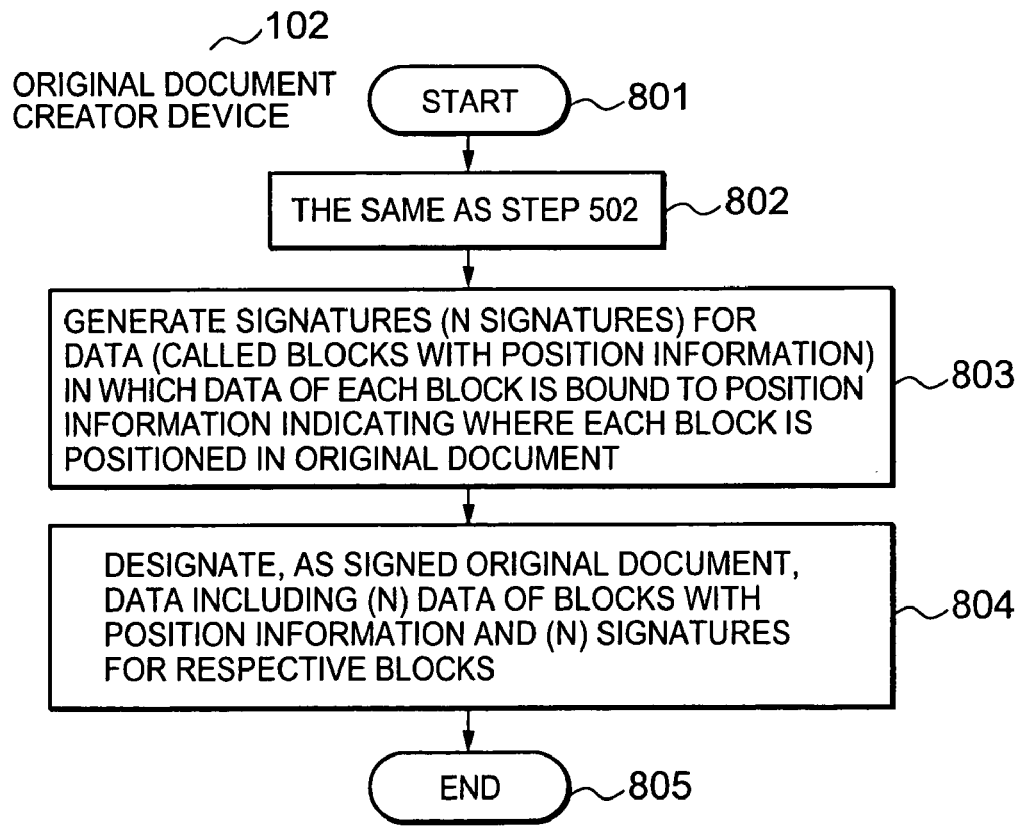
FIG. 8 is a view showing the flow of processing of the signature creation PG 222 according to a second embodiment.

FIG. 8 is a view showing the flow of processing of the signature creation PG 222 according to the second embodiment.

801: The processing is started.

802: The same as Step 502.

803: Signatures (N signatures) are generated for data (called blocks with position information) in which the data of each of the blocks is bound to position information indicating where each of the blocks is positioned in the original document.

804: Data including the (N-number of) data of the blocks with position information and the (N-number of) signatures for the respective blocks are designated as a signed original document.

805: The processing is brought to an end.

In the above-mentioned flow, the reason why the position information is bound to the data of each of the blocks is to prevent the illegal act of changing the order of the blocks. The position information may make use of, for example, consecutive numbers each indicating what number block the corresponding block is, as counted from the first block. If the original document is divided into blocks on a byte-by-byte basis in order from its front, each of the consecutive numbers indicates what number byte the corresponding byte is. If the original document is a structured document described by XML (extensible Markup Language) or the like, far more appropriate information which reflects its structure may also be used as position information.

Figure 9:
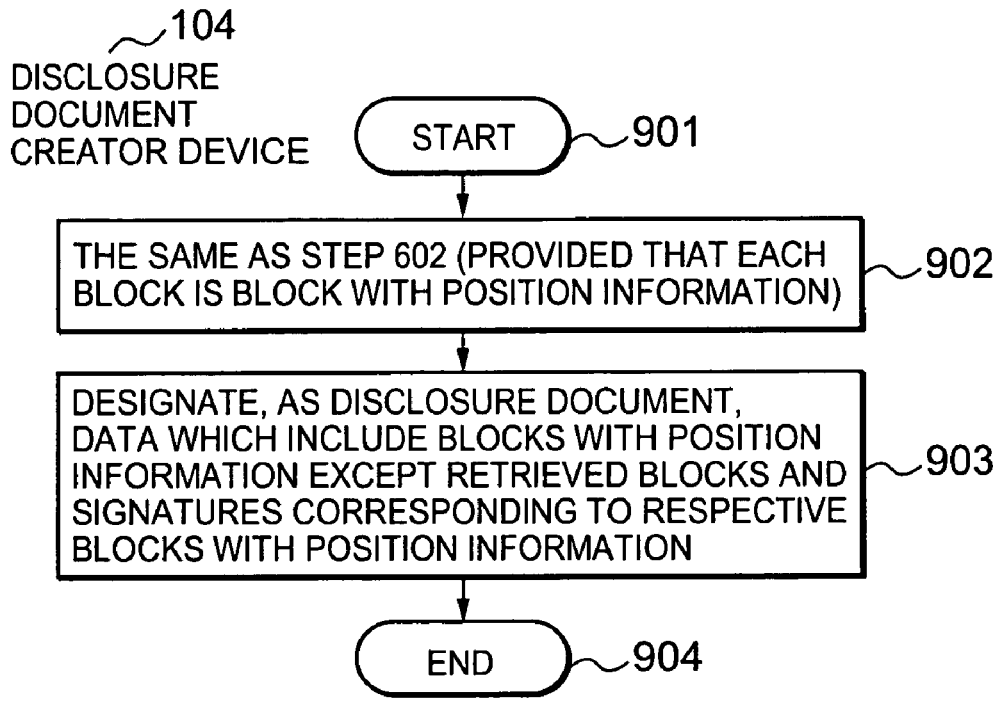
FIG. 9 is a view showing the flow of processing of the disclosure document creation PG 230 according to the second embodiment.

FIG. 9 is a view showing the flow of processing of the disclosure document creation PG 230 according to the second embodiment.

901: The processing is started.

902: The same as Step 602 (provided that each of the blocks is a block with position information).

903: Data which include the blocks with position information except the retrieved blocks (i.e., undisclosed blocks) and signatures corresponding to the respective blocks with position information (the number of the signatures coincides with the number of the disclosed blocks) are designated as a signed original document.

904: The processing is brought to an end.

Figure 10:
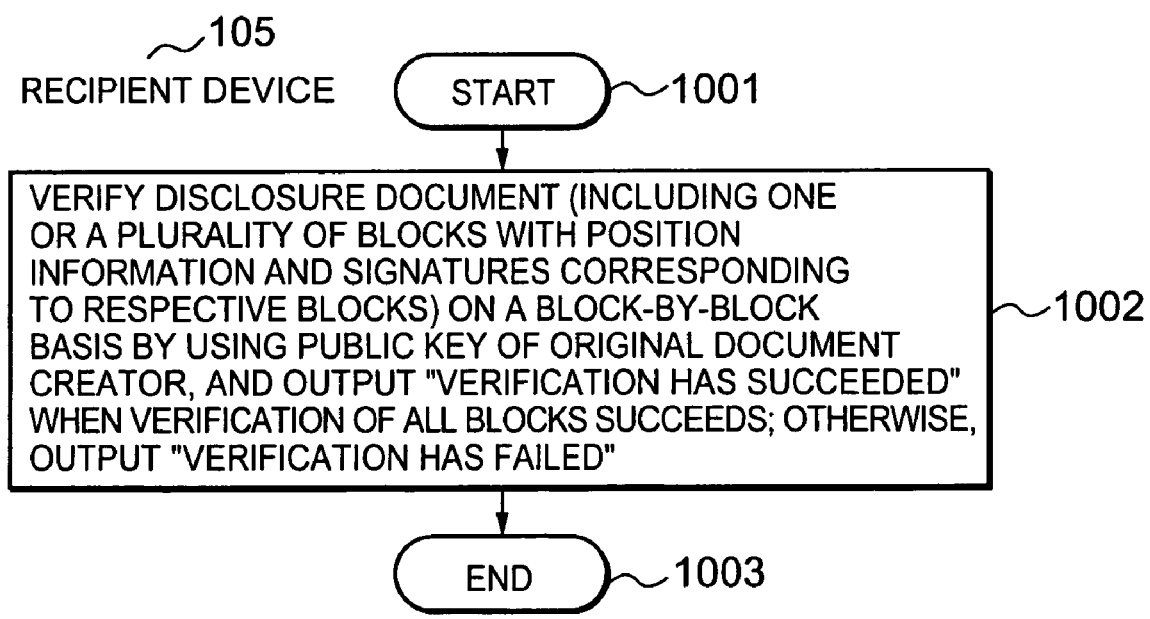
FIG. 10 is a view showing the flow of processing of the disclosure document verification PG 233 according to the second embodiment.

FIG. 10 is a view showing the flow of processing of the disclosure document verification PG 233 according to the second embodiment.

1001: The processing is started.

1002: The disclosure document (including one or a plurality of blocks with position information and signatures corresponding to the respective blocks) is verified on a block-by-block basis by using the public key of the original document creator, and when verification of all the blocks succeeds, the message "verification has succeeded" outputted; otherwise, the message "verification has failed" is outputted.

1003: The processing is brought to an end.

In the following description, reference is made to the fact that the above-mentioned electronic document authenticity assurance technique (the second embodiment) satisfies the nature 1, the nature 2, the nature 3 and the nature 4.

In the second embodiment, the disclosure document includes the substrings of the original document and the signatures of the original document creator corresponding to the respective blocks constituting the substrings. Accordingly, it is possible to confirm the authenticity of the disclosure document by repeatedly executing an existing electronic signature verification technique by the number of the blocks. The nature 1 and the nature 2 are, therefore, satisfied. In addition, the disclosure document does not include the blocks containing the information inappropriate for disclosure, and therefore, the nature 3 is satisfied. Furthermore, the signature information affixed to the disclosure document is unrelated to the blocks containing the information inappropriate for disclosure; that is to say, when the signatures affixed to the disclosure document are to be generated, the blocks containing the information inappropriate for disclosure are not used as input information, so that the nature 4 is also satisfied.

As described above, the second embodiment satisfies the natures desired in each of the embodiments. In addition, as viewed from the point of view of efficiency, the first embodiment needs to generate 2 to the N-th power of signatures for an original document made of N blocks, whereas the second embodiment needs only to generate N-number of signatures.

A third embodiment which is improved in efficiency to a further extent will be described below. As will be described later, the third embodiment does not satisfy the nature 4. Accordingly, the third embodiment is a method to be applied to information disclosure systems which do not need the nature 4. To describe how the third embodiment is realized, a detailed description will be given in connection with the signature creation PG 222 operating in the original document creator unit 102, the disclosure document creation PG 230 operating in the disclosure document creator unit 104, and the disclosure document verification PG 233 operating in the recipient unit 105.

The third embodiment makes use of a cryptographic hash function (hereinafter referred to simply as the hash function). The hash function receives arbitrary-length data as its input and outputs fixed-length data, and has the characteristics that: (1) it is impossible to calculate the original input from the output (one-way); and (2) it is impossible to find two inputs giving the same output (collision resistant) Specific known examples are SHA-1 and MD5.

Figure 11:
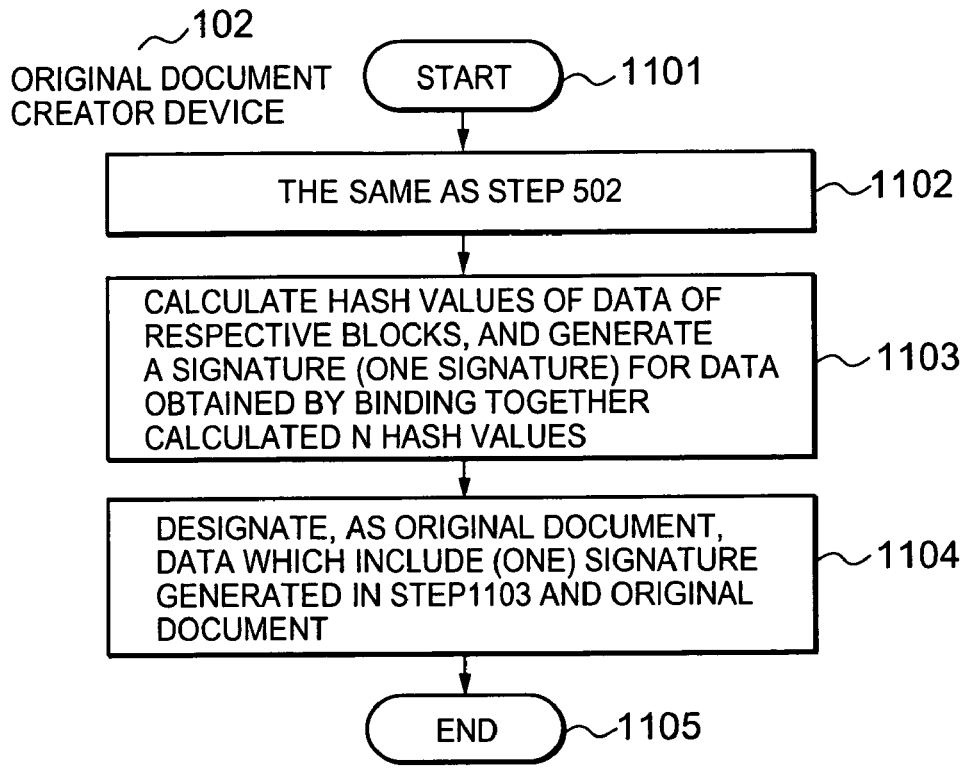
FIG. 11 is a view showing the flow of processing of the signature creation PG 222 according to a third embodiment.

FIG. 11 is a view showing the flow of processing of the signature creation PG 222 according to the third embodiment.

1101: The processing is started.

1102: The same as Step 502.

1103: The hash values of the data of the respective blocks are calculated, and a signature (one signature) is generated for data obtained by binding together the calculated N hash values.

1104: Data which include the (one) signature generated in Step 1103 and the original document are designated as a signed original document.

Figure 12:
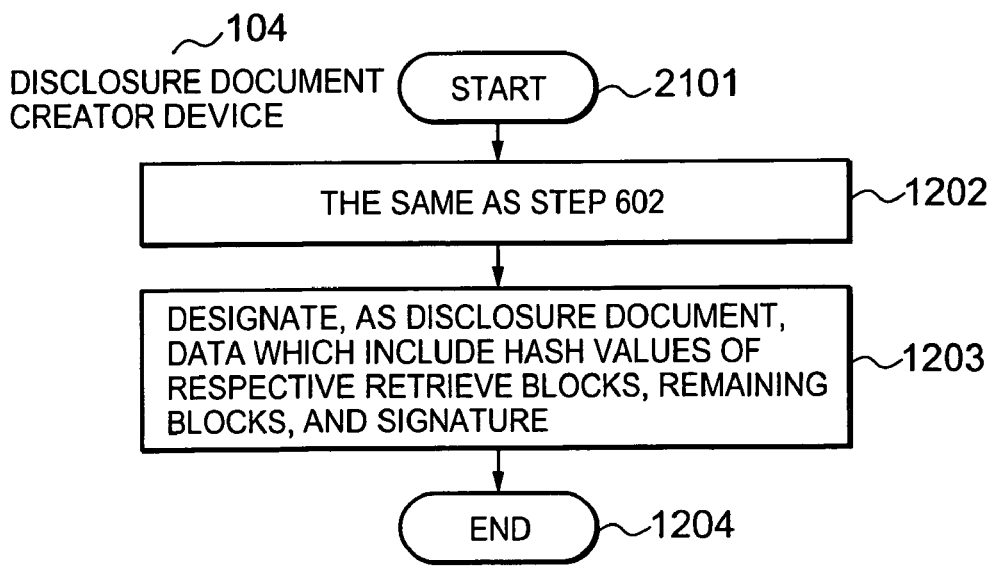
FIG. 12 is a view showing the flow of processing of the disclosure document creation PG 230 according to the third embodiment.

FIG. 12 is a view showing the flow of processing of the disclosure document creation PG 230 according to the third embodiment.

1201: The processing is started.

1202: The same as Step 602.

1203: Data which include the hash values of the respective retrieved blocks, the remaining blocks except the blocks, and the signature are designated as a disclosed document (i.e., as to the retrieved blocks (corresponding to undisclosed blocks), not the blocks themselves but their hash values are used, and as to the remaining blocks (corresponding to disclosed blocks), the blocks themselves are used).

1204: The processing is brought to an end.

Figure 13:
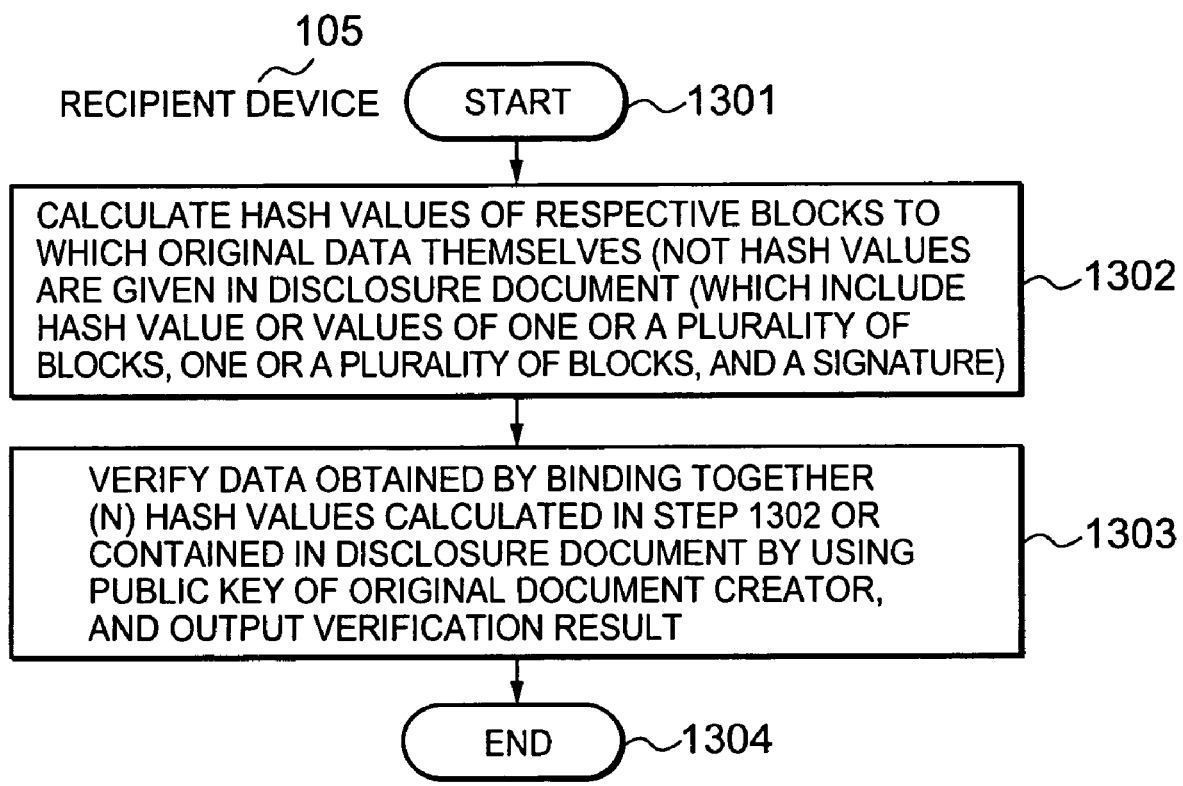
FIG. 13 is a view showing the flow of processing of the disclosure document verification PG 233 according to the third embodiment.

FIG. 13 is a view showing the flow of processing of the disclosure document verification PG 233 according to the third embodiment.

1301: The processing is started.

1302: The hash values of blocks are calculated to which the original data themselves (not hash values) are given in the disclosure document (which includes the hash value or values of one or a plurality of blocks, the one or the plurality of blocks, and a signature).

1303: Data obtained by binding together the hash values (a total of N hash values) calculated in Step 1302 or contained in the disclosure document are verified by using a public key of the original document creator, and the result of verification is outputted.

1304: The processing is brought to an end.

In the third embodiment as well, position information which specifies the position of each of the block may be used as in the case of the second embodiment. If position information is used, it becomes easy to determine the order in which the hash values are bound together in Step 1303.

The above-mentioned electronic document authenticity assurance technique (the third embodiment) is described below, which satisfies the nature 1 and the nature 3 but not the nature 4.

In the third embodiment, the disclosure document includes blocks themselves which are disclosable blocks of the original document, the hash value of a block which is a block inappropriate for disclosure, and the signature of the original document creator that is affixed to data obtained by binding together the hash values of the respective blocks of the original document. Accordingly, if a recipient calculates the hash values of the blocks which are disclosed themselves, binds these hash values to the disclosed hash values of the blocks whose hash values are disclosed, and performs signature verification by using this bound value as signature object data, the recipient can confirm the authenticity of the disclosure document. The nature 1 is, therefore, satisfied. In addition, owing to the collision resistance of the hash function, it is difficult to apply any manipulation other than the substitution of the hash-value blocks for the original-document blocks, and therefore, the nature 2 is also satisfied. Information depending on the information inappropriate for disclosure, that is contained in the disclosure document, is the hash value of the block inappropriate for disclosure and the signature generated depending on the hash value. It can be seen, therefore, that the nature 3 is satisfied owing to the one-way characteristic of the hash function. On the other hand, an attacker who has inferred the block inappropriate for disclosure from the context can confirm whether his/her inference is correct, by calculating the hash value of the inferred block and examining whether the calculated hash value coincides with any of the disclosed hash values. If his/her inference is correct, the inference can be used as information which assures the correctness of the result of the inference, so that the third embodiment does not satisfy the nature 4.

As described above, the third embodiment satisfies the nature 1 and the nature 3 but not the nature 4, among the above-mentioned desired natures. However, in terms of efficiency, the third embodiment is superior to the second embodiment because one signature needs only to be generated for the original document including N blocks.

A fourth embodiment which incorporates the third embodiment improved to satisfy the nature 4 will be described below. A detailed description will be given in connection with the signature creation PG 222 operating in the original document creator unit 102, the disclosure document creation PG 230 operating in the disclosure document creator unit 104, and the disclosure document verification PG 233 operating in the recipient unit 105.

Figure 14:
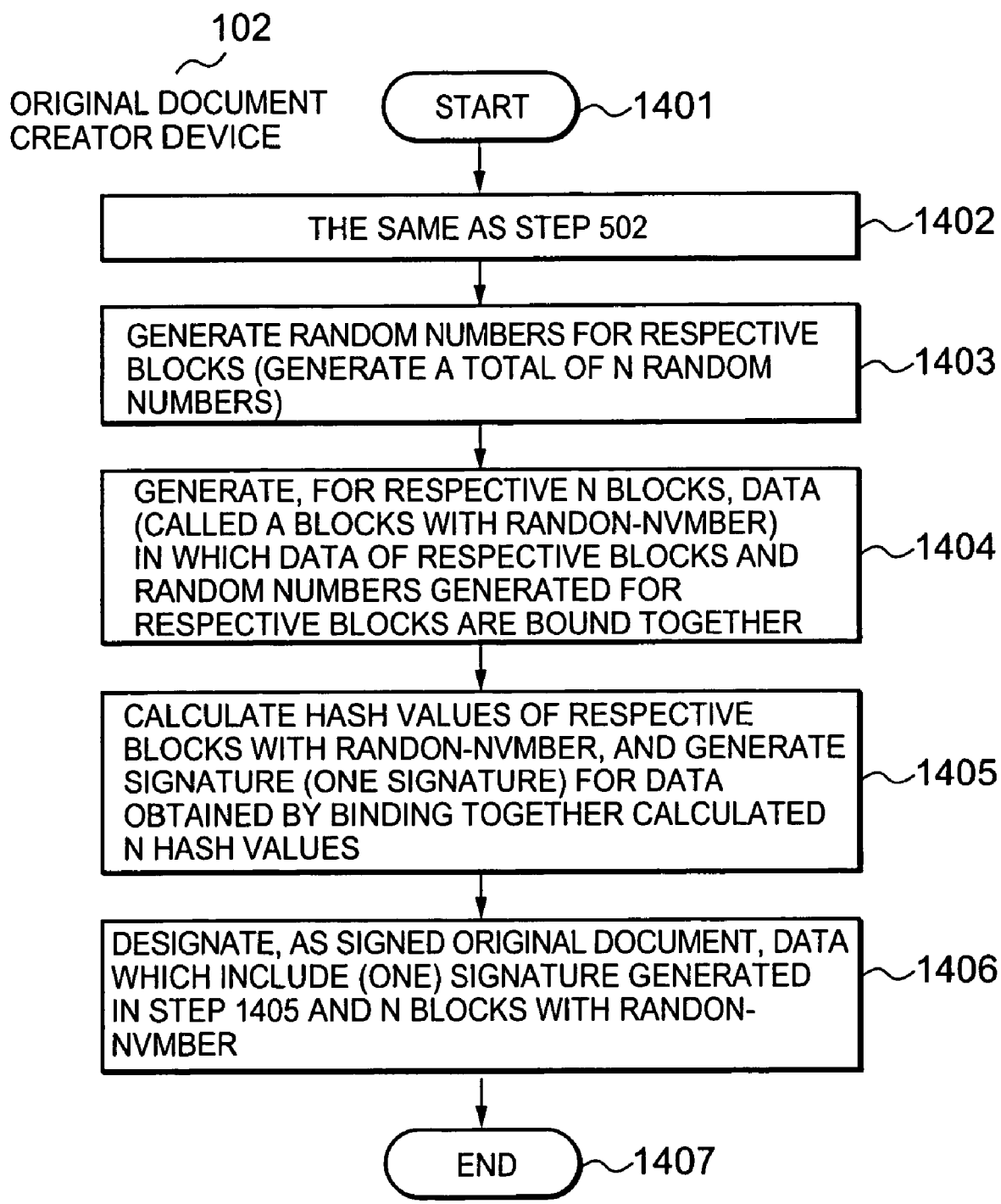
FIG. 14 is a view showing the flow of processing of the signature creation PG 222 according to a fourth embodiment.

FIG. 14 is a view showing the flow of processing of the signature creation PG 222 according to the fourth embodiment.

1401: The processing is started.

1402: The same as Step 502.

1403: Random numbers are generated for the respective blocks (a total of N random numbers are generated).

1404: Data (called random-numbered blocks) in which the data of the respective N blocks and the random numbers generated for the respective N blocks are bound together are generated for the respective N blocks.

1405: The hash values of the respective random-numbered blocks are calculated and a signature (one signature) is generated for data obtained by binding together the calculated N hash values.

1406: Data which include the (one) signature generated in Step 1405 and the N random-numbered blocks are designated as a signed original document.

1407: The processing is brought to an end.

Figure 15:
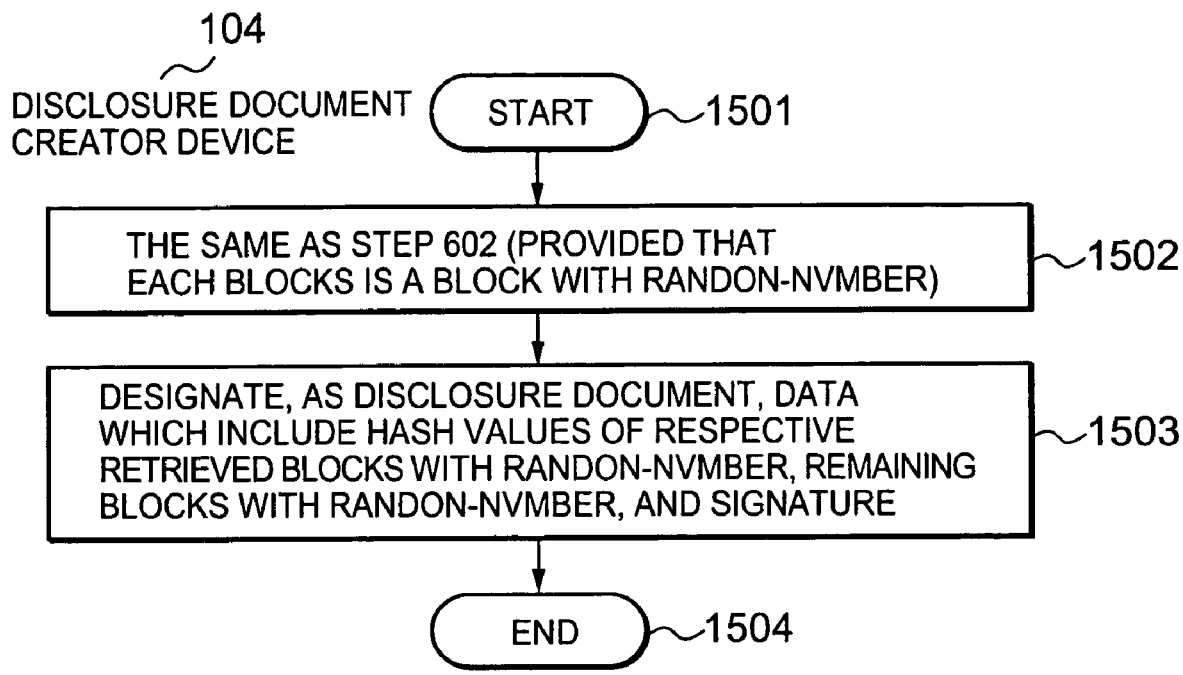
FIG. 15 is a view showing the flow of processing of the disclosure document creation PG 230 according to the fourth embodiment.

FIG. 15 is a view showing the flow of processing of the disclosure document creation PG 230 according to the fourth embodiment.

1501: The processing is started.

1502: The same as Step 602 (provided that each of the blocks is a random-numbered block).

1503: Data which include the hash values of the retrieved random-numbered blocks, the remaining random-numbered blocks except the retrieved ones, and the signature are designated as a disclosure document (i.e., as to the retrieved random-numbered blocks (corresponding to undisclosed blocks), not the random-numbered blocks themselves but the hash values are used, while as to the remaining random-numbered blocks (corresponding to disclosed blocks), the random-numbered blocks themselves are used).

1504: The processing is brought to an end.

Figure 16:
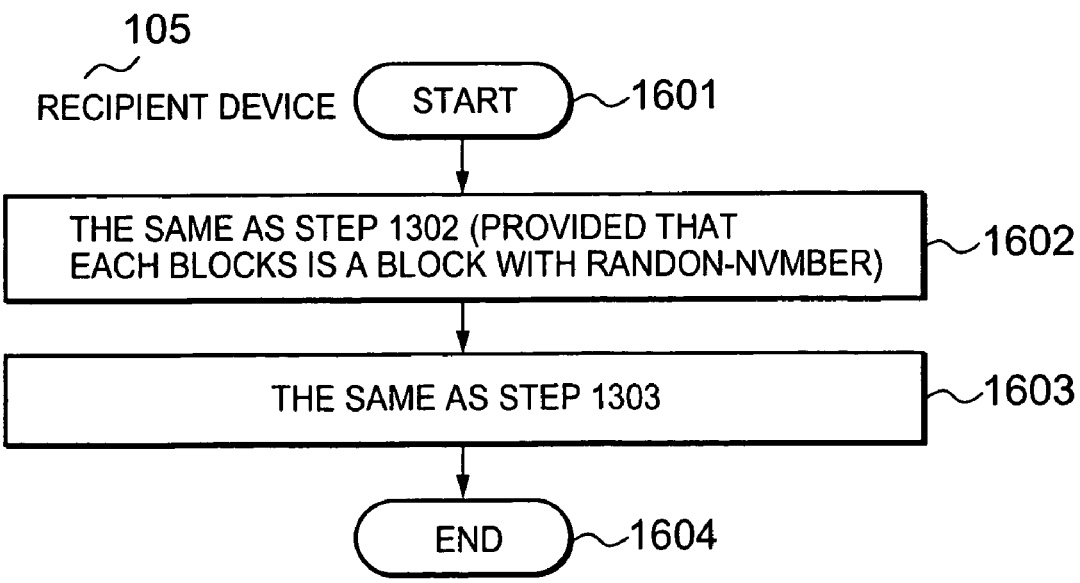
FIG. 16 is a view showing the flow of processing of the disclosure document verification PG 233 according to the fourth embodiment.

FIG. 16 is a view showing the flow of processing of the disclosure document verification PG 233 according to the fourth embodiment.

1601: The processing is started.

1602: The same as Step 1302 (provided that each of the blocks is a random-numbered block).

1603: The same as Step 1303.

1604: The processing is brought to an end.

In the fourth embodiment as well, position information which specifies the position of each of the blocks may be used as in the case of the second embodiment. If position information is used, it becomes easy to determine the order in which the hash values are bound together in Step 1603.

The above-mentioned electronic document authenticity assurance technique (the fourth embodiment) is described, which satisfies the nature 1, the nature 3 and the nature 4. As to the natures 1, 2 and 3, the fourth embodiment is similar to the third embodiment. In the following description, reference is made to the fact that the fourth embodiment also satisfies the nature 4. In the case of the fourth embodiment, an attacker who has inferred a block inappropriate for disclosure from the context or the like cannot easily find examine whether his/her inference is correct, by comparing the hash values. This is because even if the information of the inferred block is correct, the hash values do not coincide if random numbers to be bound together are not correct. In addition, since the random numbers are generated independently of the context, the inference of the random numbers is extremely difficult, and is impossible in practical terms. Accordingly, the fourth embodiment also satisfies the nature 4.

As described above, the fourth embodiment satisfies the desired natures. In addition, from the point of view of efficiency, for an original document made of N blocks, the first embodiment needs to generate 2 to the N-th power of signatures and the second embodiment needs to generate N-number of signatures, whereas the fourth embodiment needs only to generate one signature. Accordingly, the fourth embodiment is superior to the first and second embodiments.

A function called a message commitment scheme may be used instead of the hash function used in the above-mentioned fourth embodiment. The message commitment scheme is a function which calculates a value called a commit with respect to a message and which has two natures: hiding (it is remarkably difficult to acquire information on the original message from commit) and binding (it is remarkably difficult to find out a message different from the original inputted message coincident with a given commit) (when the original message is given, it is possible to easily confirm whether the original message corresponds to commit). One example of the message commitment scheme is disclosed in S. Halevi and S. Micali, "Practical and Provably-Secure Commitment Schemes from Collision-Free Hashing", In CRYPTO '96, LNCS 1109, Springer-Verlag, Berlin, 1996.

The message commitment scheme disclosed in the above-mentioned document is configured by a combination of hash functions, so that as compared with the case where a hash function is used independently, the message commitment scheme requires a large processing load but is superior in that the information of the original message is information theoretically hidden.

FIGS. 17 to 20 are, respectively, schematic views of the structures of the signed original documents 107 and the disclosure documents 108 which are created in accordance with the respective first to fourth embodiments (in each example, the number of blocks is five and the third block is an undisclosed block).

The disclosure documents created according to the respective second to fourth embodiments can be subjected to additional blackout. Namely, a recipient or another entity that has acquired the disclosure document can additionally black out blocks except the blocks deleted (blacked out) by the disclosure document creator that are contained in the disclosure document. This nature is in some cases considered undesirable in particular situations.

For example, in the case where the information disclosure system shown in FIG. 1 has the risk that a disclosure document which is being sent from the disclosure document creator unit 104 to the recipient unit 105 is altered on the network 101, a dishonest person can delete, i.e., additionally blacks out, information inconvenient for the dishonest person, which is contained in the disclosure document, and send the altered document to the recipient unit 105. In this case, the recipient cannot discriminate between the original disclosure document and the disclosure document additionally blacked out by the dishonest person (i.e., the recipient can confirm that either of the disclosure documents is part of the original document), so that, from the recipient, it cannot be said that the above-mentioned nature is desirable for the original purpose of information disclosure.

A new nature desired to be incorporated into electronic document authenticity assurance techniques is hereinafter referred to as nature 5 (it is possible to prevent additional blackout of a disclosure document) and a fifth embodiment which is improved to satisfy this nature 5 as well will be described below.

The fifth embodiment is described taking an example based on the electronic document authenticity assurance technique described above as the fourth embodiment. However, the fifth embodiment is not limited to this configuration, and may also have a configuration based on other electronic document authenticity assurance techniques.

In the fifth embodiment, a signing secret key of a disclosure document creator is previously stored in the external storage device of the disclosure document creator unit 104. A signature verifying public key which is paired with the signing secret key can be acquired by a recipient, for example, on a Web server. Incidentally, the processing performed in the original document creator unit 102 is basically the same as the fourth embodiment.

Step 1503 described previously in the flow of processing, shown in FIG. 15, of the disclosure document creation PG 230 according to the fourth embodiment is modified as follows.

1503 (modified): The signature of the disclosure document creator is affixed to data which include the hash values of the retrieved random-numbered blocks, the remaining random-numbered blocks except the retrieved ones, and the signature, by using the signing secret key of the disclosure document creator, and the signed disclosure document is designated as a disclosure document (i.e., a disclosure document which includes the disclosure document created in the fourth embodiment and the signature affixed thereto by the disclosure document creator is designated as a disclosure document according to the fifth embodiment).

Step 1602 described previously in the flow of processing, shown in FIG. 16, of the disclosure document verification PG 233 according to the fourth embodiment is modified as follows.

1602 (modified): The signature of the disclosure document creator which has been affixed to the disclosure document is verified by using a public key which verifies the signature of the disclosure document creator. When verification succeeds, the same processing as Step 1302 (provided that each of the blocks is a random-numbered block) is performed, whereas when verification fails, the disclosure document is regarded as illegal, and the processing is brought to an end.

According to the fifth embodiment, the signature of the disclosure document creator is affixed to the disclosure document created in the disclosure document creator unit 104. Accordingly, if any user other than the disclosure document creator additionally blacks out the disclosure document, the fifth embodiment fails in verifying the signature of the disclosure document creator, whereby it is possible to prevent additional blackout.

Another new nature which provides another countermeasure against additional blackout is hereinafter referred to as nature 6 (a disclosure document creator can select whether to allow or prevent additional blackout of a disclosure document), and a sixth embodiment which is improved to satisfy this nature 6 as well will be described below.

The fifth embodiment is intended to prevent additional blackout from being applied to the entire disclosure document, but there are considered to be situations where the disclosure document creator of a disclosure document desires to prevent additional blackout of a certain portion of the disclosure document, but desires to allow additional blackout of another certain portion of the same. According to the sixth embodiment, there is an electronic document authenticity assurance technique which enables a disclosure document creator to select whether to allow or prevent this additional blackout.

If the nature 6 is satisfied, the nature 5 is also satisfied, because a disclosure document creator can prevent additional blackout from being applied to the disclosure document, by setting the sixth embodiment to prevent additional blackout from being applied to the entire disclosure document.

Figure 21:
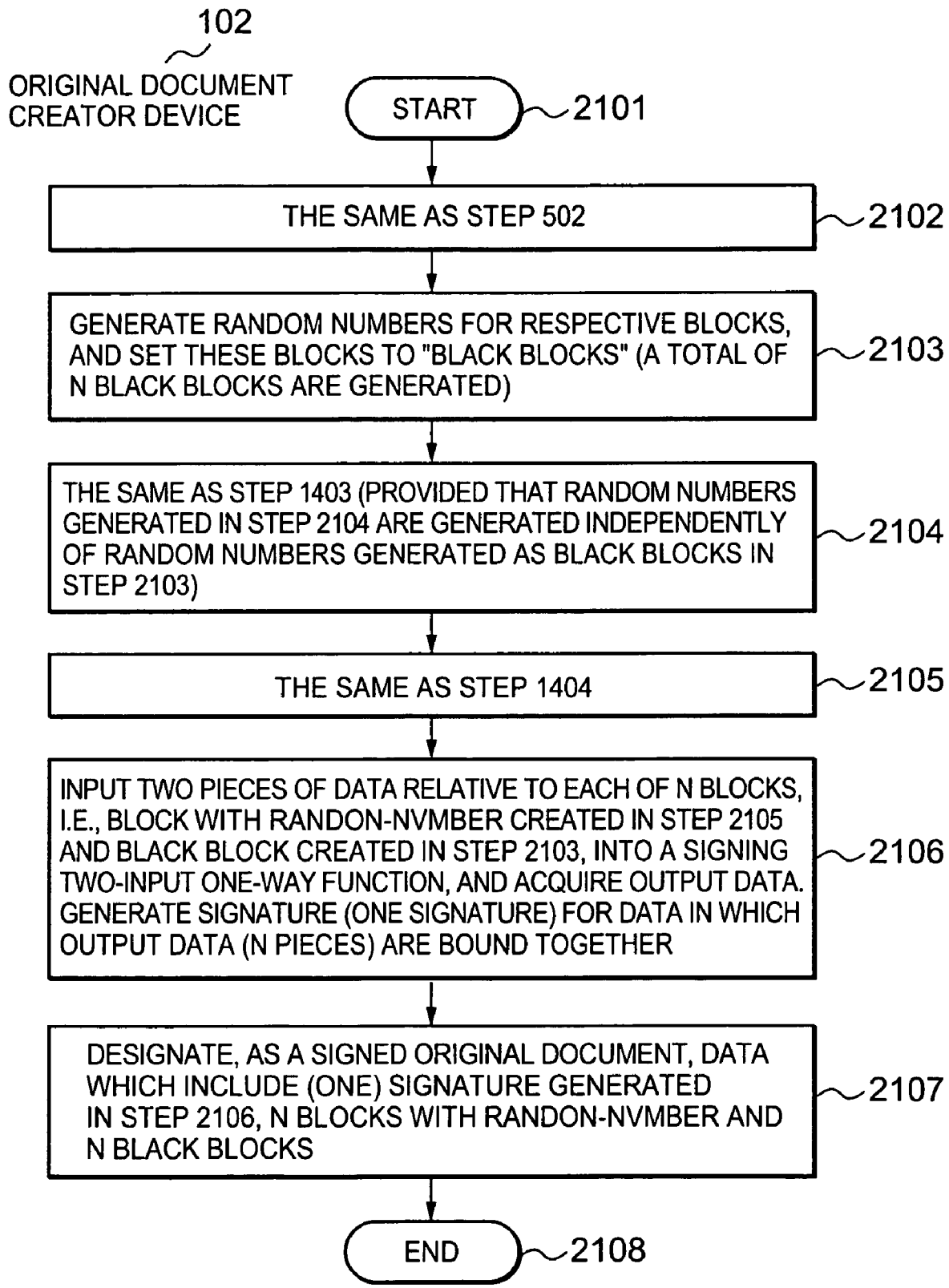
FIG. 21 is a view showing the flow of processing of the signature creation PG 222 according to a sixth embodiment.

FIG. 21 is a view showing the flow of processing of the signature creation PG 222 according to the sixth embodiment.
2101: The processing is started.
2102: The same as Step 502.

2103: Random numbers are generated for the respective blocks. These blocks are called "black blocks". (A total of N black numbers are generated).
2104: The same as Step 1403 (provided that the random numbers generated in Step 2104 are generated independently of the random numbers generated as the black blocks in Step 2103).
2105: The same as Step 1404.
2106: Two pieces of data relative to each of the N blocks, i.e., the corresponding one of the random-numbered blocks created in Step 2105 and the corresponding one of the black blocks created in Step 2103, are inputted into a signing two-input one-way function, and the output data from the signing two-input one-way function are acquired. A signature (one signature) is generated for data in which the output data (N pieces) are bound together. It is assumed here that the signing two-input one-way function is a function which satisfies the following conditions and is known to the entire system. Namely, the signing two-input one-way function is a function which outputs one value (C) with respect to two input values (A and B), and satisfies the following conditions:

(1) when A' and B' are inputted, C' which is $C' \neq C$ is outputted except a negligible probability if $A' \neq A$ and $B' \neq B$;

(2) even if A and C are known, B cannot be inferred, except a negligible probability; and (3) even if B and C are known, A cannot be inferred, except a negligible probability.

A specific example of a configuration method according to the sixth embodiment will be described later.

2107: Data which include the (one) signature generated in Step 2106, the N random-numbered blocks and the N black blocks are designated as a signed original document.
2108: The processing is brought to an end.

Figure 22:
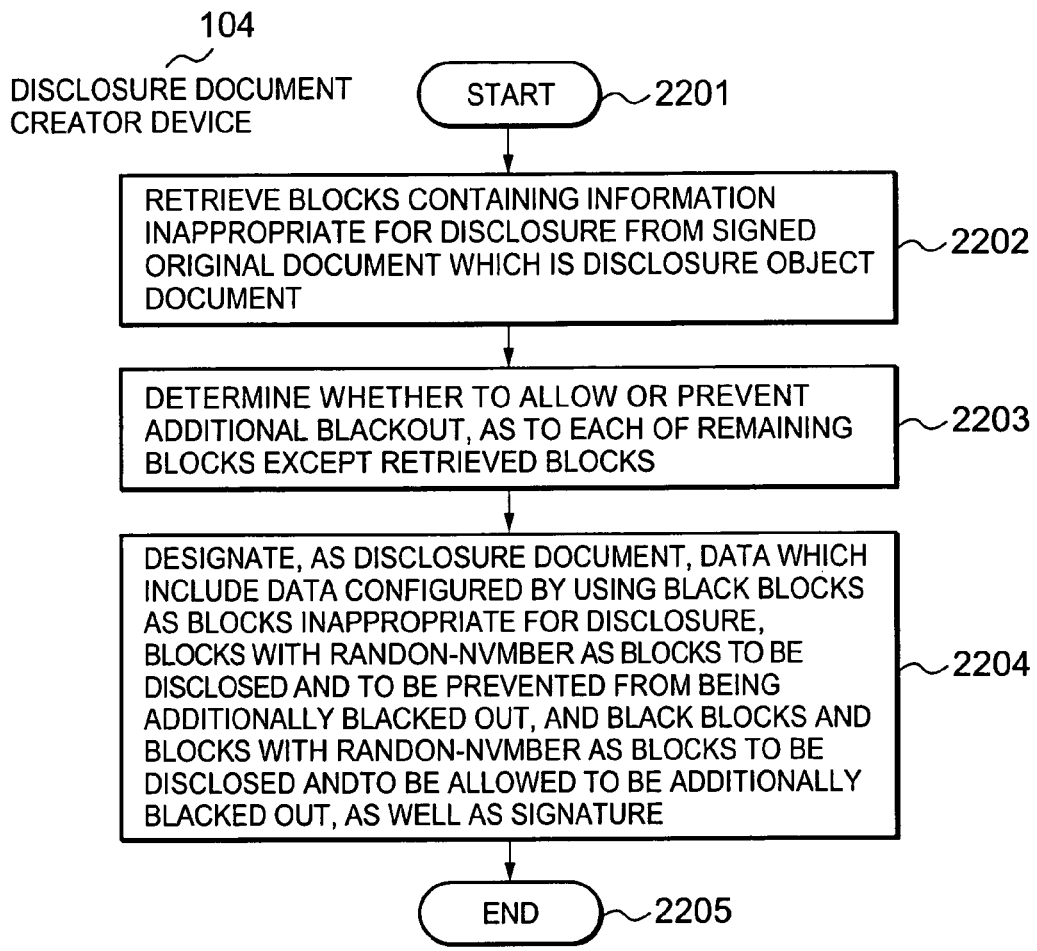
FIG. 22 is a view showing the flow of processing of the disclosure document creation PG 230 according to the sixth embodiment.

FIG. 22 is a view showing the flow of processing of the disclosure document creation PG 230 according to the sixth embodiment.
2201: The processing is started.
2202: Blocks containing information inappropriate for disclosure are retrieved from the signed original document which is the disclosure object document.
2203: It is determined whether to allow or prevent additional blackout, as to each of the remaining blocks except the retrieved blocks.
2204: Data are designated as a disclosure document, which include data configured by using black blocks as blocks inappropriate for disclosure, random-numbered blocks as blocks to be disclosed and to be prevented from being additionally blacked out, and black blocks and random-numbered blocks as blocks to be disclosed and to be allowed to be additionally blacked out, as well as the signature.
2205: The processing is brought to an end.

Figure 23:
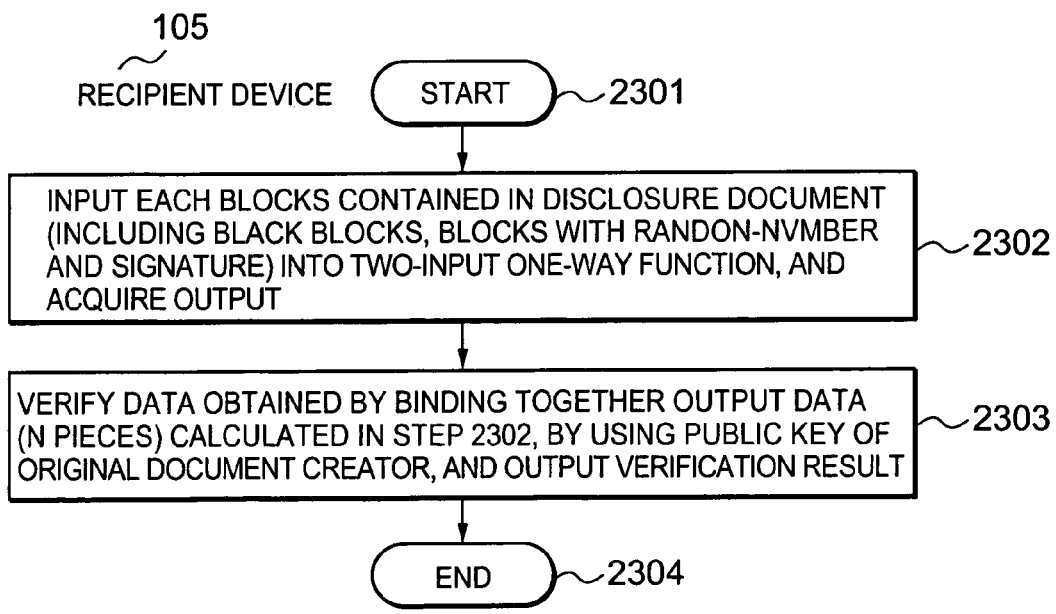
FIG. 23 is a view showing the flow of processing of the disclosure document verification PG 233 according to the sixth embodiment.

FIG. 23 is a view showing the flow of processing of the disclosure document verification PG 233 according to the sixth embodiment.
2301: The processing is started.
2302: Each of the blocks contained in the disclosure document (including the black blocks, the random-numbered blocks and the signature) is inputted to a verifying function corresponding to the signing two-input one-way function, and an output is provided from the verifying function. A specific example of a method which configures the verifying function will be described later.
2303: Data obtained by binding together the output data (N pieces) calculated in Step 2302 are verified by using the public key of the original document creator, and the result of verification is outputted.
2304: The processing is brought to an end.

The recipient who has received the disclosure document created in accordance with the disclosure document creation PG 230 cannot black out the blocks that have been determined, by the original document creator, to be prevented from being additionally blacked out. This is because the recipient cannot acquire black blocks corresponding to those blocks.

A specific example of the configuration of the verifying function corresponding to the signing two-input one-way function is as follows.

(For Generation of Signature)

With respect to the input values A and B, a straight line L passing through two points (1, h(A)) and (2, h(B)) is found (h is a hash function). Then, points (0, Q) and (3, P) whose respective x coordinates on the straight line L are 0 and 3 are found, and Q and P are outputted. Incidentally, since P is used for verification, P is incorporated into the disclosure document as auxiliary data in Step 2107.

(For Verification of Signature)

Inputs are the input value A' or B' and an auxiliary input P'. A straight light L passing through two points (1, h(A')) or (2, h(B')) and (3, P') is found. Then, a point (0, Q') whose x coordinate on the straight line L is 0 is found, and Q' and P' are outputted.

In the above-mentioned configuration, the values of the x coordinate may differ from 0, 1, 2 and 3 if they are values common to the system.

Another specific example of the configuration of the verifying function corresponding to the signing two-input one-way function may be as follows.

(For Generation of Signature)

With respect to the input values A and B, h(A) and h(B) are found, and data obtained by binding together these hash values are outputted (h is a hash function). Incidentally, since h(A) and h(B) are used for verification, h(A) and h(B) are incorporated into the disclosure document as auxiliary data in Step 2107.

(For Verification of Signature)

Inputs are the input value A' or B' and auxiliary inputs h(A') and h(B'). If A' is inputted, h(A') is calculated, and h(A') and h(B') are outputted. If B' is inputted, h(B') is calculated, and h(B') and h(A') are outputted.

The sixth embodiment is particularly effective in the case where a plurality of disclosure document creator units 104 are connected to the network 101 and documents are circulated among the disclosure document creator units 104. For example, it is assumed that two areas A and B exist in one original document and an original document creator X desires to make a decision as to whether to allow disclosure of the information in the area A, while an original document creator Y desires to make a decision as to whether to allow disclosure of the information in the area B. At this time, according to the sixth embodiment, it is possible to prevent the original document creator Y from performing any act that is beyond the limits of his/her original authority, such as (unduly) blacking out the information in the area A.

Specifically, the disclosure document creator X who has received the original document determines whether to allow disclosure of each block contained in the area A, and sets a portion to be disclosed, as a block to be disclosed and to be prevented from being additionally blacked out, and blacks out a portion not to be disclosed. The disclosure document creator X sets each block contained in the area B as a block to be disclosed and to be allowed to be additionally blacked out.

The disclosure document creator Y who has received the disclosure document which is set in this manner (disclosed to Y by X) determines whether each block contained in the area B is allowed to be disclosed, and sets a portion to be disclosed, as a block to be disclosed and to be prevented from being additionally blacked out, and blacks out a portion not to be disclosed. This document is designated as a final disclosure document (to be disclosed to a recipient). At this time, since each block contained in the area A is set to be prevented from being additionally blacked out, the disclosure document creator Y cannot perform any act that is beyond the limits of his/her original authority, such as (unduly) blacking out the information of the area A.

Incidentally, even if the disclosure document creator X who has first received the original document blacks out information contained in the area B, beyond the limits of his/her original authority, the fact that the disclosure document creator X has exceeded his/her authority is revealed when the disclosure document creator Y receives the disclosure document disclosed to Y by X. At this time, the disclosure document creator Y may take measures such as interrupting the processing or demanding that the disclosure document creator X again perform the processing of creating the disclosure document.

In the above description of each of the first to sixth embodiments, an information disclosure institution has been taking an example, but the present invention is not limited to this example. As another example to which the invention can be applied, a seventh embodiment in which the present invention is applied to the issue of a public key certificate in a PKI (Public-key Infrastructure) will be described below.

FIG. 24 is a view schematically showing the structure of a public key certificate to be issued in the PKI (Public-key Infrastructure).

The public key certificate is data to be made widely open to the public for the purpose of making the owner of the public key clear, and includes a basic field 2410, an extension field 2420 and a signature 2430 of an authority. The basic field 2410 includes information such as version information 2411, a serial number 2412, a signature algorithm 2413, a validity period 2414, an issuer 2415, an owner 2416, and a public key 2417. The extension field 2420 includes, for example, a family name 2421, a personal name 2422, a date of birth 2423, sex 2424, an address 2425, and certificate policy information 2426.

There is a possibility that the public key certificate may include information related to privacy. For example, in the case of the public key certificate shown in FIG. 23, the family name 2421, the personal name 2422, the date of birth 2423, the sex 2424 and the address 2425 included in the extension field 2420 may be information related to privacy. The fact that these items of information are included in the public key certificate has the advantage that it is possible to explain to a third party that the information (for example, the data of birth 2423) is correct. However, in the case where these kinds of information are included in the public key certificate, even when the owner does not desire to disclose the information (for example, the date of birth 2423), the owner must disclose in order to show the validity of the public key (namely, in order to confirm an electronic signature which is affixed to the public key certificate by the authority).

By applying the present invention to the issue of the public key certificate, it is possible for the owner to show the validity of the public key while hiding the date of birth 2423. Contrarily, if the owner desires to explain the correctness of the date of birth 2423, the owner can also disclose the date of birth 2423.

For example, by using the following method, it is possible to issue the public key certificate while hiding any of the items of information included in the extension field 2420 (the family name 2421, the personal name 2422, the date of birth 2423, the sex 2424 and the address 2425).

When the authority is to affix the signature to the public key certificate, the authority divides the public key certificate into six blocks, i.e., the basic field 2410, the family name 2421, the personal name 2422, the date of birth 2423, the sex 2424 and the address 2425, and generates the electronic signature of the authority in accordance with any of the flows of processing of the signature creation PG 222 mentioned above in the descriptions of the first to sixth embodiments. The resultant data corresponding to any of the original documents according to the first to sixth embodiments is designated as the public key certificate.

If the owner who has acquired the issued public key certificate desires to show the validity of the public key while hiding, for example, the date of birth, the owner needs only to black out the block of the date of birth 2423 in accordance with any of the flows of processing of the disclosure document creation PG 230 mentioned above in the descriptions of the first to sixth embodiments.

Incidentally, the processing of the authority (for example, confirmation of identity) which is executed before the signature is affixed to the public key certificate and the processing of the authority (for example, distribution of public key certificates) which is executed after the affixture of the signature may be performed similarly to known processing of the authority.

As another form in which the present invention is applied to the issue of a public key certificate, the invention can also be applied to the issue of a single public key certificate corresponding to a plurality of public keys. This method will be described below as an eighth embodiment.

According to the eighth embodiment, since a public key certificate can be issued to a plurality of public keys at a time, processing, such as confirmation of identity, which is executed by an authority can be efficiently performed at a time.

The issue of a single public key certificate corresponding to a plurality of public keys may be performed as follows. When an authority is to affix its signature to a public key certificate (including N public keys), the authority first provides N fields (each corresponding to the public key 2417) in which to fill in the respective public keys, and divides the public key certificate into a total of N+1 blocks for the N fields for public keys and another field, and generates an electronic signature of the authority in accordance with any of the flows of processing of the signature creation PG 222 mentioned above in the descriptions of the first to sixth embodiments.

The owner who has acquired the issued public key certificate blacks out the N public keys except, for example, the first public key in accordance with any of the flows of processing of the disclosure document creation PG 230 mentioned above in the descriptions of the first to sixth embodiments, and obtains data corresponding to a disclosure document according to any of the first to sixth embodiments, as a public key certificate for the first public key.

When the owner desires to update his/her public key (namely, when the owner desires to use another public key as his/her public key), the owner may select one public key which has never been used, and black out the other public keys (including the public key which has so far been used). At this time, the authority does not need to newly issue a public key certificate.

In the eighth embodiment, a public key certificate is divided into a total of N+1 blocks for N fields for public keys and another field, but different configurations may also be adopted. For example, the other field may also be subdivided into a plurality of blocks. Furthermore, the eighth embodiment may also be combined with the sixth embodiment.

Each of the first to eighth embodiments is described taking examples in which electronic document authenticity assurance techniques are configured on the basis of electronic signature techniques, but different configurations may also be adopted. For example, if a reliable third-party organ exists, an original document creator may deposit an original document (or its hash values or the like) in a unit of the third-party organ in advance, and a recipient may inquire the unit of the third-party organ about the authenticity of a disclosure document. Even in this case, it is possible to apply the first to fourth embodiments described hereinabove. For example, data designated as a signature object (namely, the data of a signed original document except a signature) in each of the methods of the first to fourth embodiments may be deposited in the unit of the third-party organ.

Each of the first to eighth embodiments is described taking the case in which an original document has a configuration in which blocks as constituent elements are arranged sequentially, but different configurations may also be adopted. For example, in the case where an original document is described in a structured document format, such as XML (extensible Markup Language), a hierarchical relationship can be considered to exist between each element. Namely, in the case where the area defined between the start tag and the end tag of an element name "B" is contained in the area between the start tag and the end tag of an element name "A", "A" can be regarded as a common element of "B". In the case where this hierarchical structure exists, electronic document authenticity assurance techniques may be designed according to the hierarchical structure.

For example, in the second embodiment, as described previously, serial numbers are assigned to individual blocks as position information indicating the positions of the respective blocks in the document, but unlike this method, information indicating positions in a hierarchical structure may also be used. Specifically, for example, in an ordinary document having a hierarchical structure, information corresponding to "Chapter X, Section Y, Paragraph Z", which are used for identifying positions in the document, may also be used as position information (on the other hand, the case where serial numbers assigned from the front like page numbers in ordinary documents are used as position information corresponds to the above description of the second embodiment). Otherwise, more generally, position information may be expressed by the elements of a set whose appropriate partial order is defined.

Each of the first to eighth embodiments is described taking an example in which an original document is divided into constituent elements having no mutually common portions (Step 502) to perform signal generation, but the original document may also be divided into constituent elements having mutually common portions. Even in this case, it is possible to apply any of the above-mentioned first to fourth embodiments.

Although the description of each of the first to sixth embodiments states that an undisclosed portion is blacked out, that is to say, disclosed in a state covered with black color, undisclosure processing may also be performed with other methods.

Although each of the above-mentioned first to sixth embodiments has been applied to administrative documents, the above description is not limitative. The invention can be applied to various electronic documents whose signature object portions are desired to be appropriately modified after the affixture of signatures.

The invention can also be applied not only to electronic documents, but more generally to digital data such as image data, video data and audio data. In this case, the setting of blocks may be appropriately performed according to the structure of digital data.

The specification and drawings are, accordingly, to be regarded in an illustrative rather than a restrictive sense. It will, however, be evident that various modifications and changes may be made thereto without departing from the spirit and scope of the invention as set forth in the claims.

What is claimed is:

1. An electronic document redacting system comprising:
   a first electronic calculator executing a first program embodied in a storage medium, which creates a disclosure object electronic document including at least an original electronic document comprising a plurality of constituent elements and authenticity assurance data; and
   a second electronic calculator executing a second program embodied in a storage medium, which creates a disclosure electronic document by implementing a redacting process to the disclosure object electronic document,
   wherein the first electronic calculator implements the first program and executes a series of processes comprising:
   (a) a process which creates additional redacted control data with respect to each of the constituent elements of the original electronic document and calculates a hash value by means of an input of the additional redacted control data as a cryptographic hash function as well as calculating a hash value by means of an input of the constituent element as a cryptographic hash function;
   (b) a process which creates one electronic signature of the disclosure object electronic document creator by means of the hash values calculated by the process (a);
   (c) a process which creates the authenticity assurance data including the additional redacted control data created by the process (a) and the electronic signature, and
   (d) a process which creates the disclosure object electronic document including the original electronic document and the authenticity assurance data; and
   wherein the second electronic calculator implements the second program and executes a series of processes comprising:
   (e) according to the plurality of the constituent elements constituting the original electronic document, a process which checks a presence of any redacted constituent element which is made redacted and a disclosure constituent element which is prohibited to be an additional redacted process;
   (f) according to each of the redacted constituent elements, a process which calculates a hash value by means of an input of the redacted constituent element as the cryptographic hash function as well as calculating a hash value by means of an input of the additional redacted control data of the authenticity assurance data corresponding to each of disclosure elements which prohibits the additional redacted process;
   (g) a process which creates a second authenticity assurance data, which is an updated version of the authenticity assurance data, by including the hash value calculated in accordance with the redacted constituent element into the authenticity assurance data and substituting the additional redacted control data of the authenticity assurance data corresponding to disclosure constituent element which prohibits the additional redacted process into the corresponding calculated hash value, and
   (h) a process which creates a disclosure electronic document including the constituent element of the original electronic document except the redacted constituent element and the second authenticity assurance data.

2. The electronic document redacting system according to claim 1, wherein the first electronic calculator implements the first program and executes a series of processes further comprising:
   a process which creates random-numbers different from the further additional redacted control data according to each of the constituent elements of the original electronic document in the process (a) and makes the created random-numbers as an input of the cryptographic hash function by combining with the constituent element.

3. The electronic document redacting system according to claim 2, wherein the second electronic calculator comprises a display unit or a printer and implements the second program and executes a series of processes further comprising:
   a process which displays information indicated by the plurality of disclosure constituent elements constituting the disclosure electronic document and information indicating redaction, which replaced the redacted constituent element of the original electronic document on a screen of the display unit, and
   a process which prints information indicated by the plurality of disclosure constituent elements constituting the disclosure electronic document and information indicating redaction, which replaced the redacted constituent element of the original electronic document to medium by the printer.

4. The electronic document redacting system according to claim 1, wherein the second electronic calculator comprises a display unit or a printer and implements the second program and executes a series of processes further comprising:
   a process which displays information indicated by the plurality of disclosure constituent elements constituting the disclosure electronic document and information indicating redaction, which replaced the redacted constituent element of the original electronic document on a screen of the display unit, and
   a process which prints information indicated by the plurality of disclosure constituent elements constituting the disclosure electronic document and information indicating redaction, which replaced the redacted constituent element of the original electronic document to medium by the printer.

5. The electronic document redacting system according to claim 1, further comprising:
   a third electronic calculator, wherein the third electronic calculator implements a third program embodied in a storage medium and executes a series of processes comprising:
   a process which checks a presence of an additional redacted constituent element which executes an additional redacted process in accordance with the disclosure constituent element of the disclosure electronic document;
   a process which calculates a hash value by means of an input of the additional redacted constituent element as a cryptographic hash function in accordance with each of the additional disclosure constituent elements;
   a process which creates a third authenticity assurance data by including the hash value calculated in accordance with the additional redacted constituent element into the second authenticity assurance data, and a process which creates a second disclosure electronic document including the constituent element of the disclosure electronic document except the additional redacted constituent elements and the third authenticity assurance data.

6. The electronic document redacting system according to claim 5, wherein the third electronic calculator implements the third program and executes a series of processes further comprising:

a process which checks a presence of disclosure constituent element which prohibits further additional redacted process in accordance with the disclosure constituent element of the disclosure electronic document, a process which calculates a hash value by means of an input of a disclosure constituent element which prohibits the further additional redacted process in accordance with each of the disclosure constituent elements which prohibit the further additional redacted process as the cryptographic hash function, a process which updates a third authenticity assurance data comprising the hash value calculated in accordance with a disclosure constituent element which prohibits the further additional redacted process into the third authenticity assurance data, a process which updates the second disclosure electronic document by updating the third authenticity assurance data comprised into the second disclosure electronic document.

7. The electronic document redacting system according to either claim 1 or claim 6, wherein the first electronic calculator implements the first program and executes a series of processes further comprising:

a process which creates random-numbers respectively different from one another as the additional redacted control data.

8. The electronic document redacting system according to claim 7, wherein the first electronic calculator implements the first program and executes a series of processes further comprising:

a process which creates further random-numbers different from the further additional redacted control data according to each of the constituent elements of the original electronic document in the process (a) and makes the further created random-numbers as an input of the cryptographic hash function by combining with the constituent element.

9. The electronic document redacting system according to claim 8, wherein the second electronic calculator comprises a display unit or a printer and implements the second program and executes a series of processes further comprising:

a process which displays information indicated by the plurality of disclosure constituent elements constituting the disclosure electronic document and information indicating redaction, which replaced the redacted constituent element of the original electronic document on a screen of the display unit, and a process which prints information indicated by the plurality of disclosure constituent elements constituting the disclosure electronic document and information indicating redaction, which replaced the redacted constituent element of the original electronic document to medium by the printer.

* * * * *